US011878273B2

(12) United States Patent
Gojo et al.

(10) Patent No.: US 11,878,273 B2
(45) Date of Patent: Jan. 23, 2024

(54) METHOD FOR WASHING FILTER AND METHOD FOR DESALINATING SEAWATER

(71) Applicant: ASAHI KASEI KABUSHIKI KAISHA, Tokyo (JP)

(72) Inventors: Yutaka Gojo, Tokyo (JP); Takahide Yoshida, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/051,942

(22) PCT Filed: May 7, 2019

(86) PCT No.: PCT/JP2019/018295
§ 371 (c)(1),
(2) Date: Oct. 30, 2020

(87) PCT Pub. No.: WO2019/216326
PCT Pub. Date: Nov. 14, 2019

(65) Prior Publication Data
US 2021/0229037 A1 Jul. 29, 2021

(30) Foreign Application Priority Data

May 11, 2018 (JP) .................. 2018-091990
May 21, 2018 (JP) .................. 2018-097397

(51) Int. Cl.
*B01D 21/01* (2006.01)
*B01D 61/14* (2006.01)
(Continued)

(52) U.S. Cl.
CPC ........... *B01D 61/145* (2013.01); *B01D 21/01* (2013.01); *B01D 61/16* (2013.01); *B01D 61/58* (2013.01); *B01D 65/06* (2013.01); *C02F 1/444* (2013.01)

(58) Field of Classification Search
CPC .... B01D 61/022; B01D 61/146; B01D 61/58; B01D 65/02; B01D 65/06; B01D 2321/168; C02F 1/444; C02F 1/722
See application file for complete search history.

(56) References Cited

U.S. PATENT DOCUMENTS

2005/0000908 A1* 1/2005 Karlsson ................ C02F 1/722
210/759
2007/0210002 A1 9/2007 Mullette et al.
(Continued)

FOREIGN PATENT DOCUMENTS

CN 101031351 9/2007
EP 1 652 571 A1 5/2006
(Continued)

OTHER PUBLICATIONS

Otani, Tsutomu et al—JP 2008183510 A machine translation—Aug. 14, 2008 (Year: 2008).*
(Continued)

Primary Examiner — Bradley R Spies
(74) Attorney, Agent, or Firm — GREENBLUM & BERNSTEIN, P.L.C.

(57) ABSTRACT

A method for washing a filter is used in a seawater desalination process including a first filtration step for subjecting seawater to microfiltration or ultrafiltration, and a second filtration step for subjecting seawater after the first filtration step to a reverse osmosis treatment. The filter is a microfiltration membrane or ultrafiltration membrane used in the first filtration step. An iron compound is added to seawater in any stage in the washing method. The washing method includes a washing chemical liquid preparation step for preparing washing chemical liquid, and a sticking matter removal step for removing matter sticking to the filter by bringing the filter into contact with washing chemical liquid. In the washing chemical liquid preparation step, seawater
(Continued)

after the first filtration step is mixed with at least hydrogen peroxide to prepare washing chemical liquid having an iron compound concentration of 1.50 mmol/L or more in terms of iron atoms.

6 Claims, 6 Drawing Sheets

(51) Int. Cl.
*B01D 61/58* (2006.01)
*B01D 65/06* (2006.01)
*C02F 1/44* (2023.01)
*B01D 61/16* (2006.01)

(56) References Cited

U.S. PATENT DOCUMENTS

| | | |
|---|---|---|
| 2010/0133184 A1 | 6/2010 | Gojo et al. |
| 2013/0220924 A1* | 8/2013 | Maeda ................. B01D 65/06 210/201 |
| 2014/0131281 A1 | 5/2014 | Morikawa et al. |
| 2016/0304371 A1 | 10/2016 | Wang et al. |
| 2017/0274325 A1 | 9/2017 | Maeda et al. |

FOREIGN PATENT DOCUMENTS

| | | | |
|---|---|---|---|
| JP | 2005-185985 | | 7/2005 |
| JP | 2008-183510 | | 8/2008 |
| JP | 2008183510 A | * | 8/2008 |
| JP | 2008-508093 A | | 3/2018 |
| WO | 2006/012691 A1 | | 2/2006 |
| WO | 2008/120509 A1 | | 10/2008 |
| WO | 2013/002244 A1 | | 1/2013 |
| WO | 2013/111826 | | 8/2013 |
| WO | 2015/045574 A1 | | 4/2015 |
| WO | 2015/083717 A1 | | 6/2015 |

OTHER PUBLICATIONS

Cotruvo, J. A.—Water Desalination Process and Associated Health and Environmental Issues—WCP Online, Jan. 2005 issue (Year: 2005).*
International Search Report issued in International Patent Application No. PCT/JP2019/018295, dated Jul. 30, 2019 and English translation thereof.
Written Opinion issued in International Patent Application No. PCT/JP2019/018295, dated Jul. 30, 2019 and English translation thereof.
English translation of International Preliminary Report on Patentability issued in International Patent Application No. PCT/JP2019/018295.

* cited by examiner

US 11,878,273 B2

METHOD FOR WASHING FILTER AND METHOD FOR DESALINATING SEAWATER

FIELD

The present invention relates to a filter cleaning method and a seawater desalination method.

BACKGROUND

Techniques for purifying raw water such as river water, lake water, groundwater, stored water, sewage, and industrial wastewater using a microfiltration membrane, an ultrafiltration membrane, or a reverse osmosis membrane are known.

When carrying out membrane filtration of raw water, substances having a size exceeding the membrane pore size (for example, suspended substances in the raw water) are blocked by the filter used in the filtration, whereby concentration polarization may occur or caking may occur in some cases. These substances become contaminants of the filter, blocking the pores of the filter, increasing the filter resistance, increasing the transmembrane pressure, and decreasing the filter flow rate. Filters in which the transmembrane pressure difference has risen to a predetermined value can be reused after removing the contaminants by cleaning to restore the filter flow rate to its initial value.

Patent Literature 1 relates to a cleaning agent for cleaning such a filter, and proposes a cleaning agent for separation membranes comprising a hydroxy dicarboxylic acid, hydrogen peroxide, and a heavy metal compound.

CITATION LIST

Patent Literature

[PTL 1] WO 2008/120509

SUMMARY

Technical Problem

Methods in which seawater is filtered and then subsequently subjected to a reverse osmosis treatment are known as seawater desalination methods. However, when the cleaning agent of Patent Literature 1 is used to clean the filter used in such seawater desalination, the desired cleaning effect may not be exhibited in some cases.

An object of the present invention is to prevent such problems and to provide a method with which the cleaning of a filter used for seawater desalination can be stably performed.

Another object of the present invention is to provide a seawater desalination method comprising a filter cleaning process which can operate stably.

Solution to Problem

The cleaning agent of Patent Literature 1 comprises a hydroxy dicarboxylic acid, hydrogen peroxide, and a heavy metal compound (for example, an iron compound). This cleaning agent is reported to be capable of cleaning and removing both organic matter and inorganic matter adhered to the filter used for the purification of raw water. The mode of operation of this cleaning agent is explained in Patent Literature 1 as follows.

In this cleaning agent, the hydroxy radical (HO·) generated by the reaction of hydrogen peroxide and a heavy metal ion derived from the heavy metal compound oxidatively decomposes and removes organic matter from the filter deposits. However, with this alone, the cleaning and removal effect on inorganic matter is insufficient, and the heavy metals used for the cleaning of the organic matter adhere to the filter surface.

By incorporating a hydroxy dicarboxylic acid in the cleaning agent with hydrogen peroxide and the heavy metal compound, it is possible to clean and remove inorganic matter from the filter deposits, as well as to remove heavy metals adhered to the filter.

When the technology of Patent Literature 1 is used to clean a filter used for the desalination of saltwater, the cleaning agent is prepared by diluting the hydroxy dicarboxylic acid, hydrogen peroxide, and the heavy metal compound with a solvent.

A solvent which is available in the location in which seawater desalination is performed is used as the solvent at this time. Specifically, for example, freshwater after filtering and subjecting the seawater to a reverse osmosis treatment can be considered as the solvent. However, if freshwater, which is a product of the seawater desalination, is used as the dilution solvent for a cleaning chemical solution, the product yield thereof will be significantly impaired.

There is a demand for the use of filtered seawater which has not been subjected to a reverse osmosis treatment as the dilution solvent of cleaning solutions.

In a seawater desalination method in which reverse osmosis treatment is performed after the seawater has been filtered, commonly the first stage filtration speed is fast, but the second stage reverse osmosis treatment is slow. Thus, when filtered seawater which has not been subjected to a reverse osmosis treatment is used as the dilution solvent of a cleaning solution, the impact thereof on the product yield is small, and this use is advantageous in cost and time.

However, the present inventors have discovered that when filtered seawater which has not been subjected to a reverse osmosis treatment is used as the dilution solvent when preparing the cleaning agent described in Patent Literature 1, the filter cleaning effect thereof is significantly low as compared to the use of freshwater which has been subjected to a reverse osmosis treatment as the dilution solvent.

As a result of investigation to determine the cause thereof, the present inventors have discovered that filtered seawater which has not been subjected to a reverse osmosis treatment includes inorganic compounds comprising ions of alkali metals and alkaline earth metals, and these inorganic compounds deactivate a portion of the heavy metal compounds, whereby the cleaning effect is impaired. Thus, it can be understood that when seawater which has not been subjected to a reverse osmosis treatment is used as a dilution solvent, even if the hydrogen peroxide concentration and the concentration of the hydroxy dicarboxylic acid in the cleaning agent are increased, the expected cleaning effect cannot be obtained.

The present inventors have achieved the present invention as a result of rigorous investigation on methods for preventing such problems.

The present invention, which can achieve the above objects, is as described below.

<<Aspect 1>> A filter cleaning method in which a filter used in a seawater desalination process is cleaned, the process comprising:
  a first filtration step in which seawater is micro-filtered or ultra-filtered, and a second filtration step in which a reverse osmosis treatment is performed on seawater after the first filtration step, wherein
the filter is a microfiltration membrane or ultrafiltration membrane used in the first filtration step,
an iron compound is added to seawater during any stage of the cleaning method,
the cleaning method comprises:
   a cleaning solution preparation step in which a cleaning solution is prepared, and
   a deposit removal step in which deposits on the filter are removed by contacting the filter and the cleaning solution, and
in the cleaning solution preparation step, the cleaning solution is prepared by mixing at least hydrogen peroxide with the seawater after the first filtration step so that an iron compound concentration thereof is not less than 1.50 mmol/L in terms of iron atoms.

<<Aspect 2>> The filter cleaning method according to Aspect 1, wherein in the cleaning solution preparation step, an iron compound is added to the seawater after the first filtration step along with hydrogen peroxide.

<<Aspect 3>> The filter cleaning method according to Aspect 1 or 2, wherein in the cleaning solution preparation step, a hydroxy dicarboxylic acid is further mixed.

<<Aspect 4>> The filter cleaning method according to Aspect 3, wherein the hydroxy dicarboxylic acid is one or more selected from the group consisting of malic acid, tartaric acid, tartronic acid, citramaric acid, dioxymaleic acid, and dioxymalonic acid.

<<Aspect 5>> The filter cleaning method according to any one of Aspects 1 to 4, wherein in the deposit removal step, measurement of the concentration of iron compound in the cleaning solution is continuously or periodically carried out.

<<Aspect 6>> The filter cleaning method according to Aspect 5, wherein when a measurement value of the iron compound concentration measurement is less than 1.50 mmol/L in terms of iron atoms, an iron compound is added to the cleaning solution.

<<Aspect 7>> The filter cleaning method according to any one of Aspects 1 to 6, further comprising, prior to the first filtration step,
   an aggregation step in which a flocculant comprising an iron compound is added to the seawater, and suspended substances in the seawater are aggregated and removed.

<<Aspect 8>> The filter cleaning method according to any one of Aspects 1 to 7, wherein the deposit removal step is performed by a filtration cleaning method.

<<Aspect 9>> The filter cleaning method according to any one of Aspects 1 to 8, wherein the deposit removal step is performed by a circulation cleaning method.

<<Aspect 10>> The filter cleaning method according to any one of Aspects 1 to 7, wherein the deposit removal step is performed by an immersion cleaning method.

<<Aspect 11>> The filter cleaning method according to any one of Aspects 1 to 10, wherein the iron compound concentration of the cleaning solution after having been subjected to the deposit removal step is not less than 6.00 mmol/L in terms of iron atoms.

<<Aspect 12>> A seawater desalination method, comprising:
a seawater desalination process, comprising:
   a first filtration step in which seawater is microfiltered or ultra-filtered, and
   a second filtration step in which a reverse osmosis treatment is performed on seawater after the first filtration step, and
a filter cleaning process in which a filter used in the seawater desalination process is cleaned, wherein
the filter is a microfiltration membrane or ultrafiltration membrane used in the first filtration step,
an iron compound is added to seawater during any stage of the desalination method,
the cleaning process comprises:
   a cleaning solution preparation step in which a cleaning solution is prepared, and
   a deposit removal step in which deposits on the filter are removed by contacting the filter and the cleaning solution, and
in the cleaning solution preparation step, the cleaning solution is prepared by mixing at least hydrogen peroxide with the seawater after the first filtration step so that an iron compound concentration thereof is not less than 1.50 mmol/L in terms of iron atoms.

<<Aspect 13>> The seawater desalination method according to Aspect 12, wherein in the cleaning solution preparation step, an iron compound is added to the seawater after the first filtration step along with hydrogen peroxide.

<<Aspect 14>> The seawater desalination method according to Aspect 12 or 13, wherein in the deposit removal step, measurement of the concentration of iron compound in the cleaning solution is continuously or periodically carried out.

<<Aspect 15>> The seawater desalination method according to Aspect 14, wherein when a measurement value of the iron compound concentration measurement is less than 1.50 mmol/L in terms of iron atoms, an iron compound is added to the cleaning solution.

<<Aspect 16>> The seawater desalination method according to any one of Aspects 12 to 15, further comprising, prior to the first filtration step:
an aggregation step in which a flocculant comprising an iron compound is added to the seawater, and suspended substances in the seawater are aggregated and removed.

<<Aspect 17>> A seawater desalination system, comprising:
a seawater desalination means comprising:
   a first filtration step in which seawater is microfiltered or ultra-filtered, and a second filtration step in which a reverse osmosis treatment is performed on seawater after the first filtration step, and
a filter cleaning means which cleans a filter used in the seawater desalination means, wherein
the filter is a microfiltration membrane or ultrafiltration membrane used in the first filtration step,
an iron compound is added to seawater in any stage of the seawater desalination system,
the cleaning means comprises:
   a cleaning solution preparation step in which a cleaning solution is prepared, and
   a deposit removal step in which deposits on the filter are removed by contacting the filter and the cleaning solution, and
in the cleaning solution preparation step, the cleaning solution is prepared by mixing at least hydrogen peroxide with the seawater after the first filtration step so that an iron compound concentration thereof is not less than 1.50 mmol/L in terms of iron atoms.

<<Aspect 18>> The seawater desalination system according to Aspect 17, wherein in the cleaning solution preparation step, an iron compound is added to the seawater after the first filtration step along with hydrogen peroxide.

<<Aspect 19>> The seawater desalination system according to Aspect 17 or 18, wherein in the deposit removal step, measurement of the concentration of iron compound in the cleaning solution is continuously or periodically carried out.

<<Aspect 20>> The seawater desalination system according to Aspect 19, wherein when a measurement value of the iron compound concentration measurement is less than 1.50 mmol/L in terms of iron atoms, an iron compound is added to the cleaning solution.

<<Aspect 21>> The seawater desalination system according to any one of Aspects 17 to 20, further comprising, prior to the first filtration step,
an aggregation step in which a flocculant comprising an iron compound is added to the seawater, and suspended substances in the seawater are aggregated and removed.

According to the present invention, a method with which the cleaning of a filter used for seawater desalination can be stably performed, and a seawater desalination method comprising a filter cleaning process which can operate stably are provided. The filter cleaning method and seawater desalination method provided by the present invention can exhibit the expected cleaning effect while filtered seawater which has not been subjected to a reverse osmosis treatment is used as a cleaning solution dilution solvent.

DESCRIPTION OF EMBODIMENTS

The filter cleaning method of the present invention is a cleaning method in which a filter used in a seawater desalination process is cleaned, comprising:
a first filtration step in which seawater is micro-filtered or ultra-filtered, and a second filtration step in which a reverse osmosis treatment is performed on seawater after the first filtration step.

The filter which is subjected to cleaning is a microfiltration membrane or ultrafiltration membrane used in the first filtration step.

In the filter cleaning method of the present invention,
an iron compound is added to seawater during any stage of the cleaning method,
and the cleaning method comprises:
a cleaning solution preparation step in which a cleaning solution is prepared, and
a deposit removal step in which deposits on the filter are removed by contacting the filter and the cleaning solution, wherein
in the cleaning solution preparation step, the cleaning solution is prepared by mixing at least hydrogen peroxide with the seawater after the first filtration step so that an iron compound concentration thereof is not less than 1.50 mmol/L in terms of iron atoms.

In the filter cleaning method of the present invention,
an iron compound may be added to the seawater in the cleaning solution preparation step after the first filtration step along with the hydrogen peroxide. In this case, the iron compound is added to the seawater in the cleaning solution preparation step.

The filter cleaning method of the present invention may further comprise, prior to the first filtration step,
an aggregation step in which a flocculant comprising an iron compound is added to the seawater, and suspended substances in the seawater are aggregated and removed. In this case, an iron compound is added to the seawater in the aggregation step.

Below, the seawater desalination process to which the filter cleaning method of the present invention is applied, and
the cleaning solution preparation step, the deposit removal step, as well as an optionally-used aggregation step of the filter cleaning method of the present will be described in order.

<<Seawater Desalination Process>>

The filter cleaning method of the present invention is applied to:
a seawater desalination process, comprising:
a first filtration step in which seawater is micro-filtered or ultra-filtered, and a second filtration step in which a reverse osmosis treatment is performed on seawater after the first filtration step.

Figure 1:
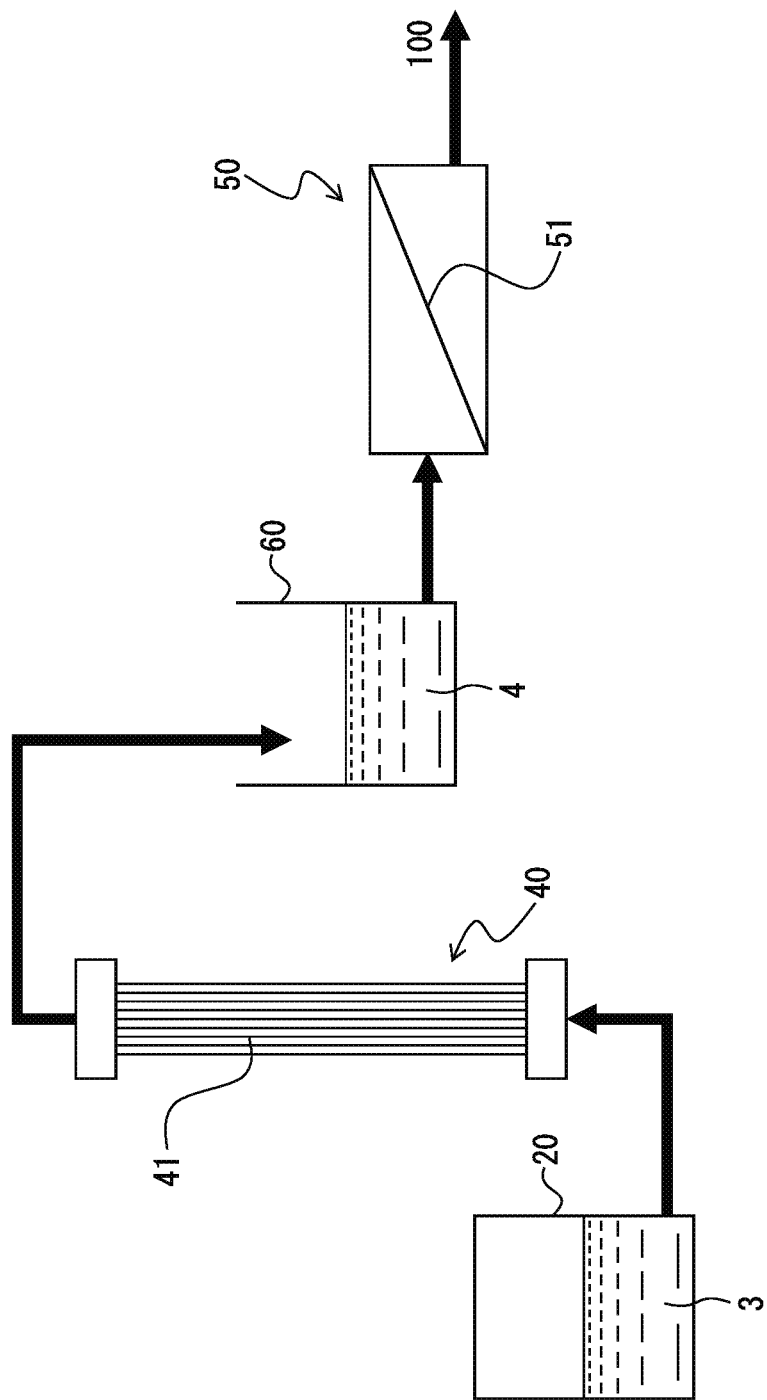
FIG. 1 is a schematic view showing an example of the seawater desalination process to which the filter cleaning method of the present invention is applied.

FIG. 1 is a schematic view showing an example of the seawater desalination process to which the filter cleaning method of the present invention is appropriately applied.

The seawater desalination process of FIG. 1 comprises a seawater tank (20), a filtration unit (40), a seawater after first filtration step tank (60), and a reverse osmosis unit (50). A coagulation tank, settling tank or centrifuge for removing insoluble matter or another filtration unit for removing solute having a relatively large diameter may be included between the seawater tank (20) and the filtration unit (40).

In FIG. 1, plumbing for connecting each tank and unit is also provided. However, valves for opening and closing the flow paths in the plumbing, pumps for pumping liquid, and compressors for pressurizing the liquid are not shown.

<First Filtration Step>

After insoluble matter or the like has been removed as necessary, the seawater (3) in the seawater tank (20) is sent to the filtration unit (40) and the first filtration step is carried out.

In the first filtration step, the seawater (3) is filtered by the microfiltration membrane or ultrafiltration membrane (41) of the filtration unit (40) to remove solute larger than the pore size of the filter, whereby seawater after first filtration step (4) is produced.

When the seawater (3) passes through the filtration unit (40), algae, sediment, bacteria, and viruses contained in the seawater (3) are removed. Though some inorganic compounds containing ions of alkali metals and alkaline earth metals contained in the seawater (3) are removed by the filtration unit (40), the remainder is contained in the seawater after first filtration step (4).

In the process of FIG. 1, the filtration unit (40) is depicted in the form of a hollow-fiber membrane module. However, the present invention is not limited thereto.

When the filtration unit (40) is a hollow-fiber membrane module, the hollow-fiber membrane module may be an "internal pressure-type" module for filtering by introducing raw water (seawater) into the hollow portion of the hollow fibers and passing the seawater through the outer wall of the hollow fibers to the outside of the hollow fibers, or may be an "external pressure-type" module for filtering by introducing raw water to the outside of the hollow fibers and passing the raw water through the outer wall of the hollow fibers to the inner hollow portion of the hollow fibers. In the case of an external pressure-type module, the plumbing for the introduction of raw water may be a side tube of the module, and the raw water introduced from an inner pipe coaxial with the longitudinal direction of the module may be sent to the outside of the hollow fibers through a water passage hole provided in a potting part (sealing part).

A filtration unit comprising an external-pressure-type module having a water passage hole in a potting part will be described below as an example. However, the present invention is not limited thereto (the same is true for FIGS. 2 to 6).

In the process of FIG. 1, seawater (3) is introduced below the filtration unit (40) from an inner pipe arranged so as to be coaxial with the longitudinal direction of the module, flows to the outside of the hollow fibers through the water passage hole provided in, for example, the potting part, further passes through the outer wall of the hollow fibers to reach the inner hollow portion of the hollow fibers, and is discharged from the inner pipe above the filtration unit (40).

<Second Filtration Step>

The seawater after the first filtration step (4), which has flowed through the filtration unit (40), flows to the seawater after first filtration step tank (60), further flows to the reverse osmosis unit (50), and the second filtration step is carried out. In the second filtration step, the seawater after the first filtration step (4) is further filtered by the reverse osmosis membrane (51) in the reverse osmosis unit (50) to obtain freshwater (100). Substances removed by the reverse osmosis unit (50) include, for example, trace materials such as salt and boron, and the remainder of the inorganic compounds comprising ions of alkali metals and alkaline earth metals which could not be removed by the filtration unit (40).

<Filter>

The filter to which the filter cleaning method of the present invention is appropriately applied is a microfiltration membrane or an ultrafiltration membrane used to filter seawater. Specifically, for example, the filter may be a microfiltration membrane or ultrafiltration membrane (41) included in the filtration unit (40).

The shape of the filter is arbitrary. For example, the filter may be a flat film-type, laminate-type, bellows-type, roll-type, or hollow-fiber-type. In view of securing a large membrane area with a small volume, a hollow fiber membrane module in which a plurality of hollow fiber filters are packaged is preferable.

The filter to which the method of the present invention is applied may be composed of any arbitrary material. For example, the filter may be composed of a fluorine-based resin or a polysulfone-based resin.

Examples of the fluorine-based resin include polytetrafluoroethylene, polychlorotrifluoroethylene, polyvinylidene fluoride, polyvinyl fluoride, perfluoroalkoxy fluorine resins, ethylene tetrafluoride-hexafluoropropylene copolymers, ethylene-tetrafluoroethylene copolymers, and ethylene-chlorotrifluoroethylene copolymers.

Examples of polysulfone-based resins include polysulfone and polyethersulfone.

Since the cleaning solution used in the method of the present invention has a strong oxidizing power, it is desirable to apply the method of the present invention to a filter having a high oxidation resistance. Thus, the method of the present invention is preferably applied to a filter composed of a fluororesin.

<<Filter Cleaning Method>>

In the filter cleaning method of the present invention:
an iron compound is added to seawater during any stage of the cleaning method, and the cleaning method comprises:
a cleaning solution preparation step in which a cleaning solution is prepared, and
a deposit removal step in which deposits on the filter are removed by contacting the filter and the cleaning solution.

These steps will be described in order below.

<Cleaning Solution Preparation Step>

In the cleaning solution preparation step, the cleaning solution is prepared by mixing the seawater after the first filtration step with at least hydrogen peroxide so that the iron compound concentration thereof is 1.50 mmol/L or more in terms of iron atoms.

In the cleaning solution preparation step, an iron compound may be added to the seawater after the first filtration step along with the hydrogen peroxide.

When the filter cleaning method of the present invention further comprises an aggregation step prior to the first filtration step, a flocculant comprising an iron compound is added to the seawater in the aggregation step. Thus, in this case, it may not be necessary to further add an iron compound to the seawater after the first filtration step in the cleaning solution preparation step.

When the filter cleaning method of the present invention does not comprise an aggregation step, the iron compound is added to the seawater after the first filtration step along with the hydrogen peroxide in the cleaning solution preparation step.

In the cleaning solution preparation step, a hydroxy dicarboxylic acid may further be mixed with the seawater after the first filtration step, the hydrogen peroxide, and the iron compound added as necessary.

(Seawater after First Filtration Step)

The seawater after the first filtration step is seawater which has been micro-filtered or ultra-filtered, but which has not been subjected to a reverse osmosis treatment.

Inorganic compounds comprising ions of alkali metals or alkaline earth metals are contained in the seawater. Though a portion of these inorganic compounds are removed by the first filtration step, as described above, the remainder is contained in the seawater after the first filtration step.

Examples of the alkaline metals constituting the inorganic compounds contained in the seawater after the first filtration step include sodium and potassium, and examples of the alkaline earth metals include calcium, magnesium, and strontium.

The ions of the alkali metals and alkaline earth metals are frequently present in the form of salts with counter anions. Examples of counter anions include fluoride ions, chloride ions, bromide ions, sulfuric acid ions, bicarbonate ions, and borate ions.

The concentrations of the inorganic compounds contained in the seawater after the first filtration step may be within the following ranges:

Inorganic compounds comprising sodium ions: 0.75 g/L to 15.0 g/L

Inorganic compounds comprising potassium ions: 0.05 g/L to 1.00 g/L

Inorganic compounds comprising calcium ions: 0.05 g/L to 1.00 g/L

Inorganic compounds comprising magnesium ions: 0.10 g/L to 2.00 g/L

When the filter cleaning method of the present invention comprises an aggregation step, the inorganic compounds described above are substantially removed by the aggregation step. Thus, when the filter cleaning method of the present invention comprises an aggregation step, the concentrations of the inorganic compounds contained in the seawater after the first filtration step may be below the ranges described above, and may be substantially 0 (zero).

(Iron Compound)

The iron compound may be a water-soluble metal salt, and is preferably a salt containing at least one of an iron (II) ion and an iron (III) ion, more preferably a chloride, sulfate, or nitrate which contains an iron (II) ion or an iron (III) ion, and one or more selected from ferrous chloride and ferric chloride is particularly preferably used. Since both ferrous chloride and ferric chloride are inexpensive, they are preferable in that they can be precipitated when an alkali (for example, sodium hydroxide) is added to the cleaning solution after use and can be easily removed by filtration.

When a metal salt is used as the iron compound, the metal salt may be an anhydrous salt or may be a hydrated salt.

The concentration of iron compound in the cleaning solution is 1.50 mmol/L or more in terms of iron atoms. By making the iron compound concentration 1.50 mmol/L or more in terms of iron atoms, even when the cleaning solution is prepared using the seawater after the first filtration step as the dilution solvent, deactivation of the iron compound by inorganic compounds can be mitigated, and the desired cleaning effect can be exhibited. The iron compound concentration, in terms of iron atoms, is preferably 2.50 mmol/L or more, more preferably 5.00 mmol/L or more, further preferably 7.50 mmol/L or more, and particularly preferably 10.0 mmol/L or more.

If the concentration of iron compound in the cleaning solution is excessively high, time and cost are required to process cleaning solution drainage after filter cleaning, which is not preferable. Thus, the concentration of iron compound in the cleaning solution, in terms of iron atoms, is preferably 50.0 mmol/L or less, more preferably 45.0 mmol/L or less, further preferably 40.0 mmol/L or less, and particularly preferably 35.0 mmol/L or less.

In the present description, the "concentration of iron compound in terms of iron atoms" means the equivalent concentration obtained by multiplying the molar concentration of the iron compound by the number of iron atoms contained in the composition formula of the iron compound. For example, the concentration of 1 mmol/L of ferrous chloride (composition formula: $FeCl_2$) in terms of iron atoms is 1 mmol/L, and the concentration of 1 mmol/L of ferric sulfate (composition formula: $Fe_2(SO_4)_3$) in terms of iron atoms is 2 mmol/L.

Note that the concentration of 1.50 mmol/L of anhydrous ferrous chloride (composition formula: $FeCl_2$, formula mass: 126.75) in terms of iron atoms corresponds to about 190 mg/L on a weight basis.

(Hydrogen Peroxide)

The concentration of hydrogen peroxide in the cleaning solution is preferably in the range of 1 mmol/L to 10,000 mmol/L (10 mol/L). At a hydrogen peroxide concentration of less than 1 mmol/L, the hydrogen peroxide is consumed prior to the completion of filter deposit removal, and the cleaning effect may be insufficient in some cases. When the concentration of hydrogen peroxide exceeds 10,000 mmol/L, though there are no issues from the viewpoint of cleaning effect, since a large amount of hydrogen peroxide will remain in the cleaning solution drainage after cleaning, a drainage treatment with a large amount of reducing agent may be required in some cases.

The concentration of hydrogen peroxide in the cleaning solution is preferably in the range of 5 mmol/L to 5,000 mmol/L, further preferably in the range of 10 mmol/L to 3,000 mmol/L.

When an aggregation step is included in the filter cleaning method of the present invention, the concentration of hydrogen peroxide in the cleaning solution is preferably in the range of 10 mmol/L to 10,000 mmol/L (10 mol/L), more preferably in the range of 100 mmol/L to 3,000 mmol/L (3 mol/L).

When preparing the cleaning solution, the hydrogen peroxide may be mixed in the form of hydrogen peroxide or may be mixed as a compound which generates hydrogen peroxide in the solution after mixing. Examples of compounds which generate hydrogen peroxide in solution include sodium percarbonate and sodium perborate.

(Hydroxy Dicarboxylic Acid)

Examples of the hydroxy dicarboxylic acid included in the cleaning solution include malic acid, tartaric acid, tartronic acid (also known as 2-hydroxy malonic acid), citramaric acid (also known as 2-methyl malic acid), dixoymaleic acid, and dioxymalonic acid. One or more selected from these can be used.

The quantity of the hydroxy dicarboxylic acid in the cleaning solution is preferably 0.001 to 10,000 times by mol relative to the quantity of the iron atoms included in the iron compound. If the quantity of the hydroxy dicarboxylic acid in the cleaning solution is less than 0.001 times by mol relative to iron atoms, there is a risk that the iron will precipitate during the cleaning of the filter. Conversely, if the quantity of the hydroxy dicarboxylic acid in the cleaning solution exceeds 10,000 times by mol relative to iron atoms, there is a risk that the hydroxy dicarboxylic acid itself will be oxidatively decomposed, whereby the performance regarding decomposition removal of the organic matter in the filter deposits may be impaired.

It is preferable that the quantity of the hydroxy dicarboxylic acid in the cleaning solution be, relative to the quantity of iron atoms included in the iron compound, 0.005 times by mol to 1,000 times by mol, further preferably 0.010 times by mol to 100 times by mol, particularly preferably 0.015 times by mol to 50 times by mol, and especially preferably 0.020 times by mol to 10 times by mol.

When an aggregation step is included in the filter cleaning method of the present invention, it is preferable that the quantity of the hydroxy dicarboxylic acid in the cleaning solution be, relative to the quantity of iron atoms included in the iron compound, 0.1 times by mol to 10,000 times by mol, more preferably 0.5 times by mol to 1,000 times by mol, further preferably 1.0 times by mol to 100 times by mol, particularly preferably 1.2 times by mol to 50 times by mol, and especially preferably 1.5 times by mol to 10 times by mol.

Further, it is preferable that the quantity of the hydroxy dicarboxylic acid in the cleaning solution be, relative to the quantity of hydrogen peroxide, 0.0001 times by mol to 100 times by mol. When the quantity of the hydroxy dicarboxylic acid in the cleaning solution is less than 0.0001 times by mol relative to the hydrogen peroxide, the effect regarding the cleaning and removal of inorganic compounds in the filter deposits may be insufficient in some case. If the quantity of the hydroxy dicarboxylic acid in the cleaning solution exceeds 100 times by mol relative to the hydrogen peroxide, the pH of the cleaning solution becomes excessively high, whereby the cleaning effect may be impaired due to the Fenton reaction.

The quantity of the hydroxy dicarboxylic acid in the cleaning solution is, relative to the quantity of hydrogen peroxide, more preferably 0.0005 times by mol to 10 times by mol, further preferably 0.001 times by mol to 1.0 times by mol, particularly preferably 0.003 times by mol to 0.5 times by mole, and especially preferably 0.005 times by mol to 0.1 times by mol.

(Optional Components)

The cleaning solution comprises seawater after the first filtration step, an iron compound, and hydrogen peroxide, and may include a hydroxy dicarboxylic acid. This iron compound may be one or more of an iron compound derived from the flocculant added to the seawater in the aggregation step and the iron compound added to the seawater after the first filtration step in the cleaning solution preparation step.

The cleaning solution may further include optional components other than the components described above.

Examples of the optional components included in the cleaning solution include surfactants, chelating agents, pH adjusting agents, thickeners, antifoaming agents, and preservatives, as well as solvents other than the seawater after the first filtration step.

—Surfactant—

Examples of the surfactant optionally added to the cleaning agent may include any of an ionic surfactant, cationic surfactant, amphoteric surfactant, or nonionic surfactant, and one or more of these can be used.

Examples of anionic surfactants include sulfate esters of higher alcohols, alkyl benzene sulfonic acids, alkyl naphthalene sulfonic acids, and phosphoric acid esters of higher alcohols;

examples of cationic surfactants include primary amine salts, secondary amine salts, tertiary amine salts, and quaternary ammonium salts;

examples of amphoteric surfactants include alkyl dimethylamine oxides, alkyl dimethylamino fatty acid betaines, and alkyl carboxymethyl hydroxyethyl imidazolium betaines; and examples of nonionic surfactants include polyoxyethylene alkyl phenyl ethers, polyoxypropylene alkyl phenyl ethers, polyoxyethylene alkyl ethers, polyoxyethylene alkyl esters, polyethylene glycol alkyl esters, ethylene oxide adducts of polypropylene glycol, and propylene oxide adducts of polypropylene glycol.

—Chelating Agent—

Examples of chelating agents which can be optionally included in the cleaning solution include 1-hydroxyethylidene-1,1-diphosphonic acid, aminotrimethylene phosphonic acid, ethylenediaminetetramethylene phosphonic acid, hexamethylenediamine tetramethylene phosphonic acid, diethylenetriaminepentamethylene phosphonic acid, and sodium salts, potassium salts, lithium salts, ammonium salts, amine salts, and alkanolamine salts thereof.

—Solvents Other than Seawater after First Filtration Step—

The cleaning solution may include, as necessary, a solvent other than the seawater after the first filtration step.

Examples of the solvent other than the seawater after the first filtration step include freshwater which is produced by filtering and subjecting seawater to a reverse osmosis treatment. However, when freshwater produced by filtration and reverse osmosis treatment is used as the dilution solvent of the cleaning solution, the product yield of the water desalination process is reduced, which is not preferable in terms of cost. Thus, it is preferable that a solvent other than seawater after the first filtration step not be used as the dilution solvent of the cleaning solution.

(pH)

The pH of the cleaning solution is preferably in the acid region in order to maintain a high cleaning removal effect of filter deposits, in particular, inorganic matter. The pH of the cleaning solution is preferably 6.0 or less, more preferably 2.0 to 5.0, further preferably 2.0 to 4.0, and in particular, may be 2.0 to 3.0.

(Cleaning Solution Preparation Method)

The cleaning solution can be prepared by mixing the specified components with seawater after the first filtration step. Though the order of mixing of each ingredient into the solvent is arbitrary, it is desirable to prevent the iron compound from adhering to the wall surface of the mixing container (for example, the cleaning solution tank (10), which will be described later) during preparation of the cleaning solution. From this viewpoint, when the iron compound is added in the cleaning solution preparation step, it is preferable to first dissolve the iron compound sufficiently in the seawater after the first filtration step, and thereafter mix the other components.

<Deposit Removal Step>

In the deposit removal step of the filter cleaning method of the present invention, the deposits on the filter are removed by contacting the filter and the cleaning solution.

The method for contacting the filter and the cleaning solution may be a filtration cleaning method in which the cleaning solution is passed in the thickness direction of the filter, or may be a surface cleaning method in which the cleaning solution flows along the surface of the filter. In the case of filtration cleaning, the flow direction when the cleaning solution flows in the thickness direction of the filter may be from the surface of the membrane on the raw water (seawater) side or may be from the surface of the membrane on the filtered water side.

The filtration cleaning and the surface cleaning may be one-way cleaning in which the cleaning solution is discarded after having been contacted with the filter one time or may be circulation cleaning in which the cleaning solution is recycled after contacting the filter one time.

An immersion cleaning method in which the cleaning solution is maintained in the filter for a predetermined interval and a cleaning method in which air bubbles are introduced simultaneously or sequentially with the cleaning solution are preferable aspects of the present invention.

The deposit removal step can be carried out at any arbitrary temperature. For example, the deposit removal step may be carried out at a temperature in the range of 0° C. to 50° C. or 5° C. to 45° C. A typical operating temperature is ambient temperature (e.g., 5° C. to 40° C.). The duration of the deposit removal step may be appropriately selected depending on the extent of deposits on the filter, the concentration of the cleaning solution, and the temperature at which the deposit removal step is carried out. For example, the duration may be 5 minutes to 48 hours, 10 minutes to 24 hours, or 20 minutes to 12 hours.

In the deposit removal step of the filter cleaning method of the present disclosure, among the deposits attached to the filter, inorganic compounds and organic compounds are removed by the process of the first stage.

The deposits removed from the filter in the deposit removal step include:
- inorganic substances including inorganic compounds which include one or more metal ions selected from calcium, magnesium, sodium, potassium, and strontium; and
- organic compounds including algae, bacteria, and viruses.

An iron compound may be included in the cleaning solution after having been subjected to the deposit removal step. This iron compound may include an iron compound mixed when preparing the cleaning solution and an iron compound derived from the flocculant used in the optionally used aggregation step.

The concentration of the iron compound included in the cleaning solution after having been subjected to the deposit removal step is, in terms of iron atoms, preferably 6.00 mmol/L or more, more preferably 10.0 mmol/L or more, further preferably 15.0 mmol/L or more, and particularly preferably 20.0 mmol/L or more.

When the deposit removal step is performed by immersion cleaning or circulation cleaning, the "cleaning solution having have been subjected to the deposit removal step" means the cleaning solution at the time at which the deposit removal step has completed.

Note that when the deposit removal step is performed by an aspect of the aforementioned circulation cleaning, while the deposit removal step is being carried out, the concentration of each of the components in the cleaning solution may be continuously or periodically monitored, and addition of cleaning solution raw materials or dilution of the cleaning solution may be performed as necessary.

Figure 2:
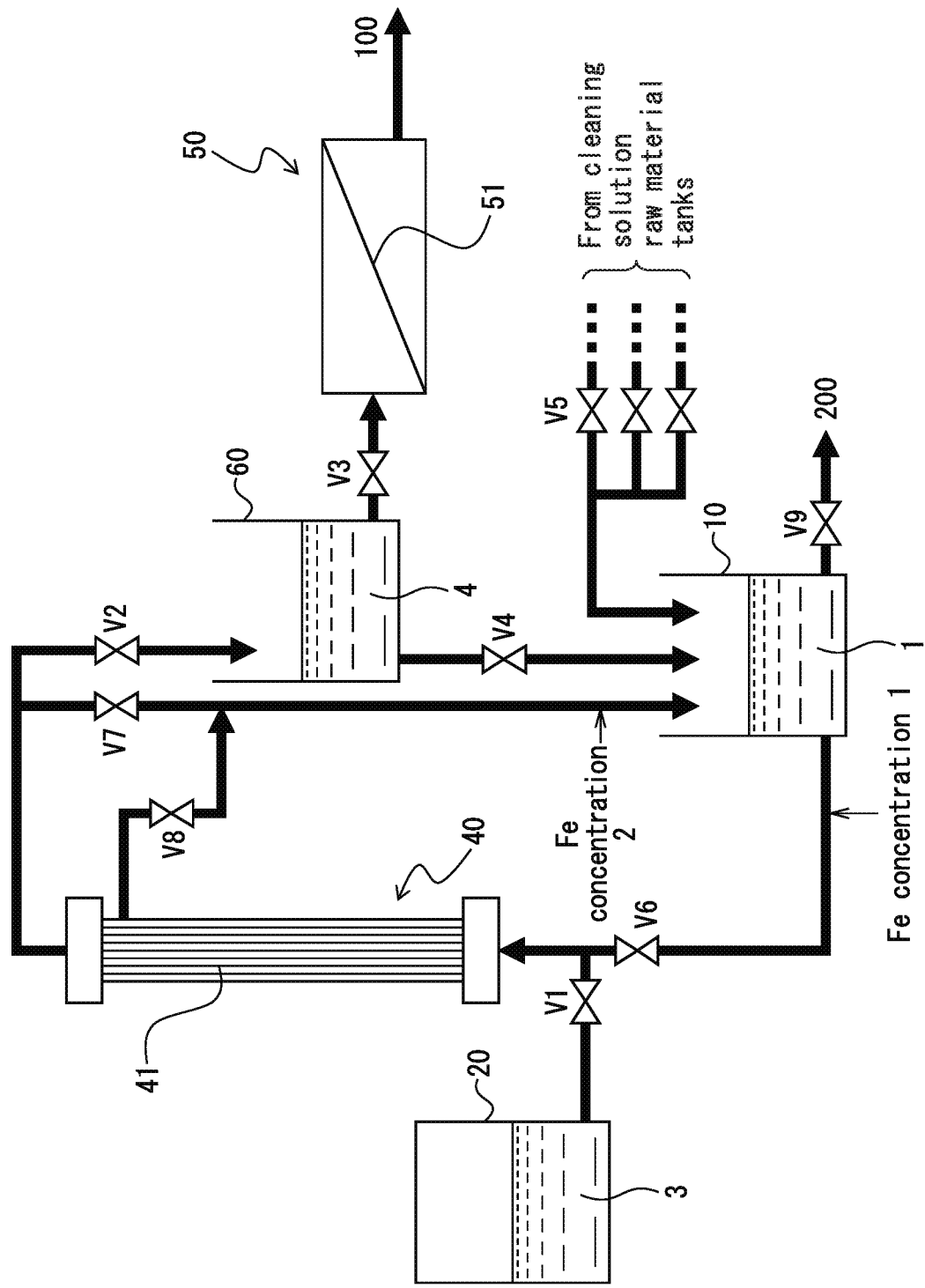
FIG. 2 is a schematic view showing an example of the seawater desalination method of the present invention.

For example, when the seawater desalination method of FIG. 2 is used in the filter cleaning method of the present invention, the iron compound concentration may be measured by sampling some of the cleaning solution being used cyclically from one or more positions among the iron compound concentration measurement positions indicated as, for example, "Fe concentration 1" and "Fe concentration 2" in FIG. 2.

In FIG. 2, in particular, when the measurement value of the iron compound concentration in the cleaning solution (1) being used cyclically is less than 1.50 mmol/L in terms of iron atoms, it is preferable that iron compound be added to the cleaning solution (1) to adjust the iron compound concentration in terms of iron atoms to 1.50 mmol/L or more. The addition of iron compound to the cleaning solution (1) may be carried out by a method in which iron compound is directly added to the cleaning solution tank (10), or may be carried out by a method in which iron compound is added from an arbitrary position in the plumbing from the cleaning solution tank (10) to the filtration unit (40).

<Aggregation Step>

The filter cleaning method of the present invention may further include, prior to the first filtration step:
- an aggregation step in which suspended substances in the seawater are aggregated and removed by adding a flocculant comprising an iron compound to the seawater.

When an aggregation step is included in the filter cleaning method of the present invention, the aggregation step may be carried out in a seawater tank, a designated aggregation apparatus, or a plumbing from the seawater tank to the filtration unit. The aggregation device may be a pressure floatation separation apparatus or a flocculation and precipitation apparatus. The addition of a flocculant to the seawater may be carried out by a method in which the flocculant is added to the seawater tank or the aggregation apparatus, or may be carried out in which the flocculant is added to an arbitrary position in the plumbing from the seawater tank to the filtration unit.

The flocculant used in the aggregation step and the cleaning solution used for cleaning the filter both include an iron compound.

In the present invention, according to such a configuration, even when seawater after the first filtration step is used as a dilution solvent in the cleaning solution preparation step, deactivation of the iron compound by inorganic compounds can be mitigated, and the desired cleaning effect can be exhibited.

Though the reason for this is not clear, the present inventors believe as follows.

However, the present invention is not bound by a particular theory.

In the case in which the cleaning solution includes an iron compound, when seawater after the first filtration step is used as the dilution solvent in the cleaning solution preparation step, the lack of exhibition of the desired cleaning effect is considered to be due to the deactivation of at least some of the iron compound in the cleaning solution by the components in the seawater after the first filtrations step.

The seawater after the first filtration step includes inorganic compounds including ions of an alkali metal or an alkaline earth metal, as described above. At least some of the iron compound in the cleaning solution is believed to react with these inorganic compounds as a cleaning catalyst and to deactivate.

The deactivation of this iron compound is mitigated by using a flocculant comprising an iron compound in the aggregation step.

When the flocculant used in the aggregation step includes an iron compound, the iron compound in the flocculant is used to aggregate the suspended substances in the seawater, which are deposited in the filter of the filtration unit. Though the iron compound in the flocculant is dissolved in the seawater in the form of ionized ions, at least some of the iron compound is believed to be trapped and deposited as filter deposits and remains on the filter.

Thus, when the filter in which deposits comprising the iron compound are deposited is cleaned by the method of the present invention, the iron compound in the deposits is dissolved in the cleaning solution, and it is believed that the iron compound concentration in the cleaning solution increases.

The amount of increase of the iron compound concentration in the cleaning solution mitigates the deactivation of the iron compound by compensating for the iron compound deactivated by the inorganic compounds in the seawater after the first filtration step, whereby it is presumed that the desired cleaning effect can be recovered.

When the filter cleaning method of the present invention comprises an aggregation step, the filter cleaning method of the present invention is applied to a seawater desalination process comprising:
- an aggregation step in which a flocculant comprising an iron compound is added to seawater and suspended substances in the seawater are aggregated and removed,
- a first filtration step in which seawater after the aggregation step is micro-filtered or ultra-filtered, and
- a second filtration step in which a reverse osmosis treatment is performed on the seawater after the first filtration step.

Figure 4:
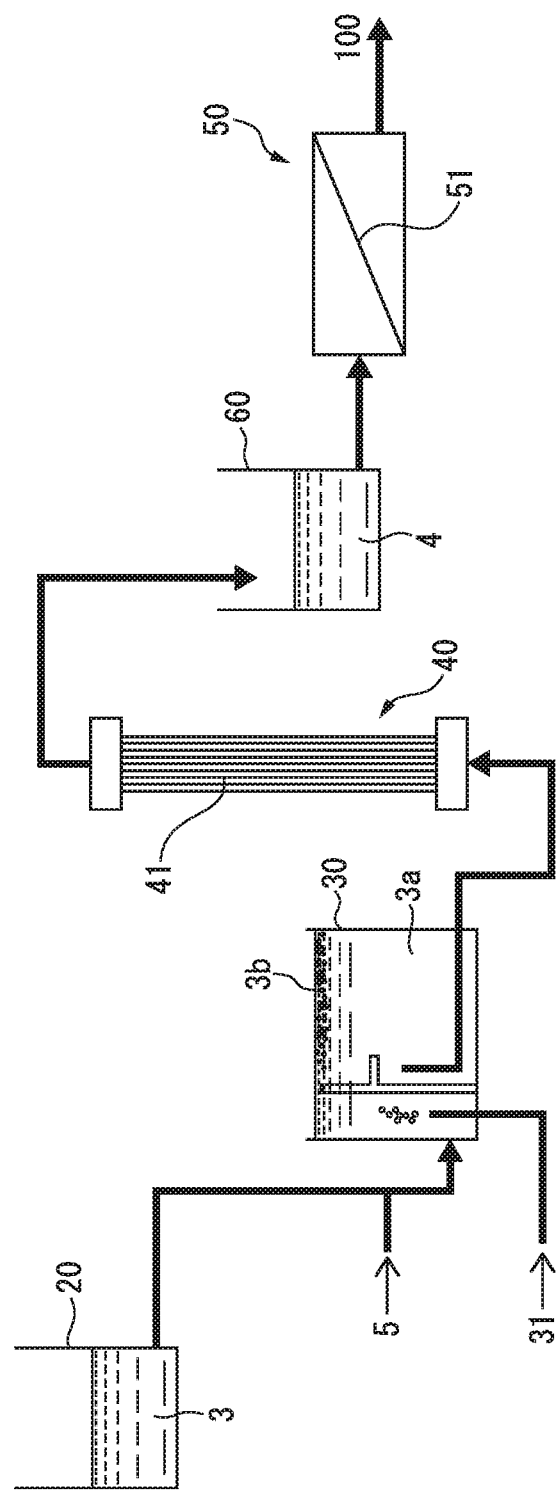
FIG. 4 is a schematic view showing yet another example of the seawater desalination method of the present invention.

FIG. 4 is a schematic view showing an example of the seawater desalination process to which the filter cleaning method of the present invention is appropriately applied.

The seawater desalination process of FIG. 4 is performed by a device comprising a seawater tank (20), a flotation tank (30), a filtration unit (40), a seawater after first filtration step tank (60), and a reverse osmosis unit (50).

Plumbing for connecting each tank and unit is also shown in FIG. 4. However, the valves for opening and closing the flow paths in the plumbing, pumps for sending liquids, and compressors for pressurizing liquids are not shown.

In the aggregation step, the flocculant (5) is contacted with the seawater (3) supplied from the seawater tank (20). As a result, suspended substances in the seawater (3) are aggregated. At this time, a suitable aggregation aid and polymer flocculant may be used in combination.

After the flocculant (5) has been contacted with the seawater (3), the seawater (3) containing the aggregates of suspended substances is introduced into the pressured float tank (30). In the flotation tank (30), pressurized water (31) in which air has been dispersed by air pressure is added to the seawater (3) comprising aggregates. The pressurized water (31) generates microbubbles in the flotation tank (30), and these microbubbles adhere to the aggregates in the seawater (3) to produce buoyancy, whereby scum (3b) floats to the upper surface of the seawater (3) in the flotation tank (30). Thus, the seawater in a lower portion of the flotation tank (30) does not contain scum (3b), whereby seawater after suspended substance removal (3a), from which the suspended substances have been removed, is produced.

The seawater after suspended substance removal (3a) is then sent to the filtration unit (40).

In the device of FIG. 4, though the flocculate (5) is supplied from the seawater supply plumbing from the seawater tank (20) to the flotation tank (30), and line-contacts with the seawater (3), the present invention is not limited to this case. The flocculant (5) may be added to the flotation tank (30), or may be added at an arbitrary position in the plumbing from the seawater tank (20) to the filtration unit (40).

Examples of the suspended substances removed from the seawater in the aggregation step as scum include floating substances, colloids, algae, and suspended inorganic substances. The aggregation step may be performed by a method other than pressure surfacing, and may be performed by directly flowing a mixture of seawater and flocculant directly to the filtration unit (40) without removing aggregates of suspended substances from the seawater.

The flocculant used in the aggregation step includes an iron compound.

The iron compound may be an anhydrous metal salt and is preferably a salt comprising at least one of an iron (II) ion and an iron (III) ion, and is more preferably a chloride, sulfate, or nitride comprising an iron (II) ion or an iron (III) ion. It is particularly preferable that one or more selected from ferrous chloride and ferric chloride be used.

The flocculant used in the aggregation step may be the same as the iron compound used in the cleaning solution preparation step, which will be described later, or may be different.

The amount of iron compound used in the aggregation step, as the iron compound quantity in terms of iron atoms relative to 1 L of seawater, is suitably 0.0002 mmol/L to 1.10 mmol/L. When this value is less than 0.0002 mmol/L, the effect of the aggregation of suspended substances in the seawater may be insufficient, and conversely, when this value exceeds 1.10 mmol/L, the concentration of surplus iron compound in the seawater after the aggregation step becomes excessive, and the burden on the microfiltration membrane or ultrafiltration membrane of the first filtration step and the reverse osmosis membrane of the second filtration step becomes excessive, which is not preferable.

The amount of iron compound used in the aggregation step, as the iron compound quantity in terms of iron atoms relative to 1 L of seawater, is preferably 0.001 mmol/L to 0.22 mmol/L.

In addition to including an iron compound in the flocculant, the aggregation step may be carried out by a known method.

The contacting of the seawater and the flocculant may be performed by a method in which the flocculant, which is prepared as a solution (for example, in the case of ferric chloride, a typical 32 wt % aqueous solution) comprising, for example, 10 wt % to 50 wt % of the iron compound, is continuously or periodically added.

The seawater including aggregates of suspended substances generated by contact thereof with the flocculant may be flowed through the filtration unit after the aggregates have been removed therefrom to produce seawater after particular removal, or may be flowed through the filtration unit as-is without removing the aggregates.

The method for obtaining seawater after suspended substance removal by removing the aggregates of suspended substances from the seawater including the aggregates may be carried out by a known method, and in addition to the pressure-surfacing method described above, removal may be carried out by a suitable method, such as a filtration method, a centrifugal separation method, a natural sedimentation method, or a multi-tank method. Though FIG. 4 shows an example in which a flotation tank (30) is used, the present invention is not limited thereto (the same is true for FIGS. 5 and 6).

<<Seawater Desalination Method>>

Another aspect of the present invention provides:

a seawater desalination method, comprising:
  a seawater desalination process, comprising:
    a first filtration step in which seawater is micro-filtered or ultra-filtered, and
    a second filtration step in which a reverse osmosis treatment is performed on seawater after the first filtration step, and
  a filter cleaning process in which the filter used in the seawater desalination process is cleaned, wherein
  the filter is the microfiltration membrane or ultrafiltration membrane used in the first filtration step,
  an iron compound is added to the seawater during any stage of the desalination method,
  the cleaning process comprises:
    a cleaning solution preparation step in which a cleaning solution is prepared, and
    a deposit removal step in which deposits on the filter are removed by contacting the filter and the cleaning solution, and
  in the cleaning solution preparation step, the cleaning solution is prepared by mixing at least hydrogen peroxide with the seawater after the first filtration step so that an iron compound concentration thereof is not less than 1.50 mmol/L in terms of iron atoms.

In the seawater desalination method of the present invention,
  in the cleaning solution preparation step, an iron compound may be added to the seawater after the first filtration step along with hydrogen peroxide.

The seawater desalination method may further comprise, prior to the first filtration step,
an aggregation step in which a flocculant comprising an iron compound is added to the seawater, and suspended substances in the seawater are aggregated and removed.

Regarding the steps constituting the seawater desalination process and filter cleaning process of the seawater desalination method of the present application, refer to the explanations regarding the steps of the filter cleaning method of the present invention.

Figure 3:
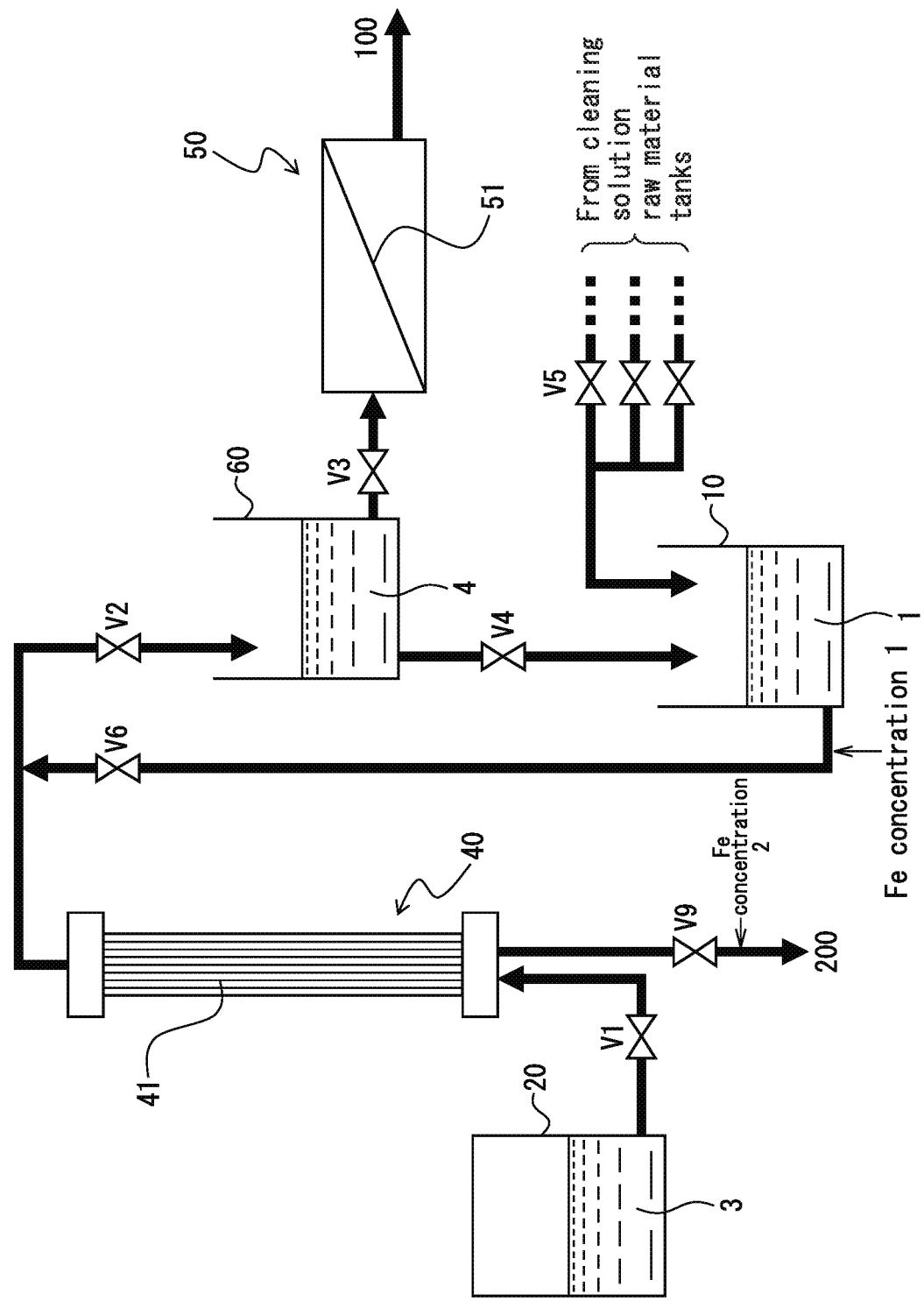
FIG. 3 is a schematic view showing another example of the seawater desalination method of the present invention.
Figure 5:
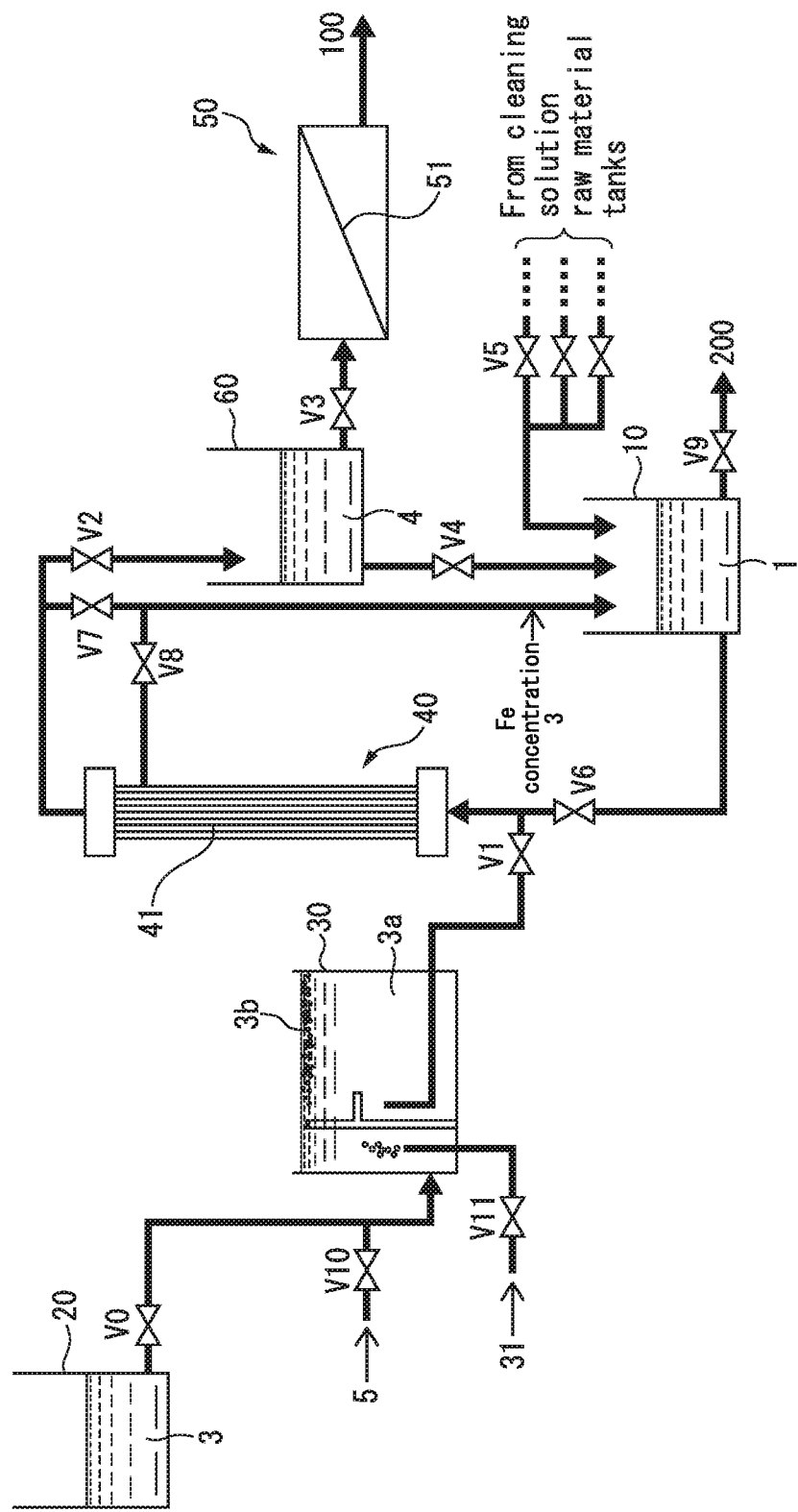
FIG. 5 is a schematic view showing yet another example of the seawater desalination method of the present invention.
Figure 6:
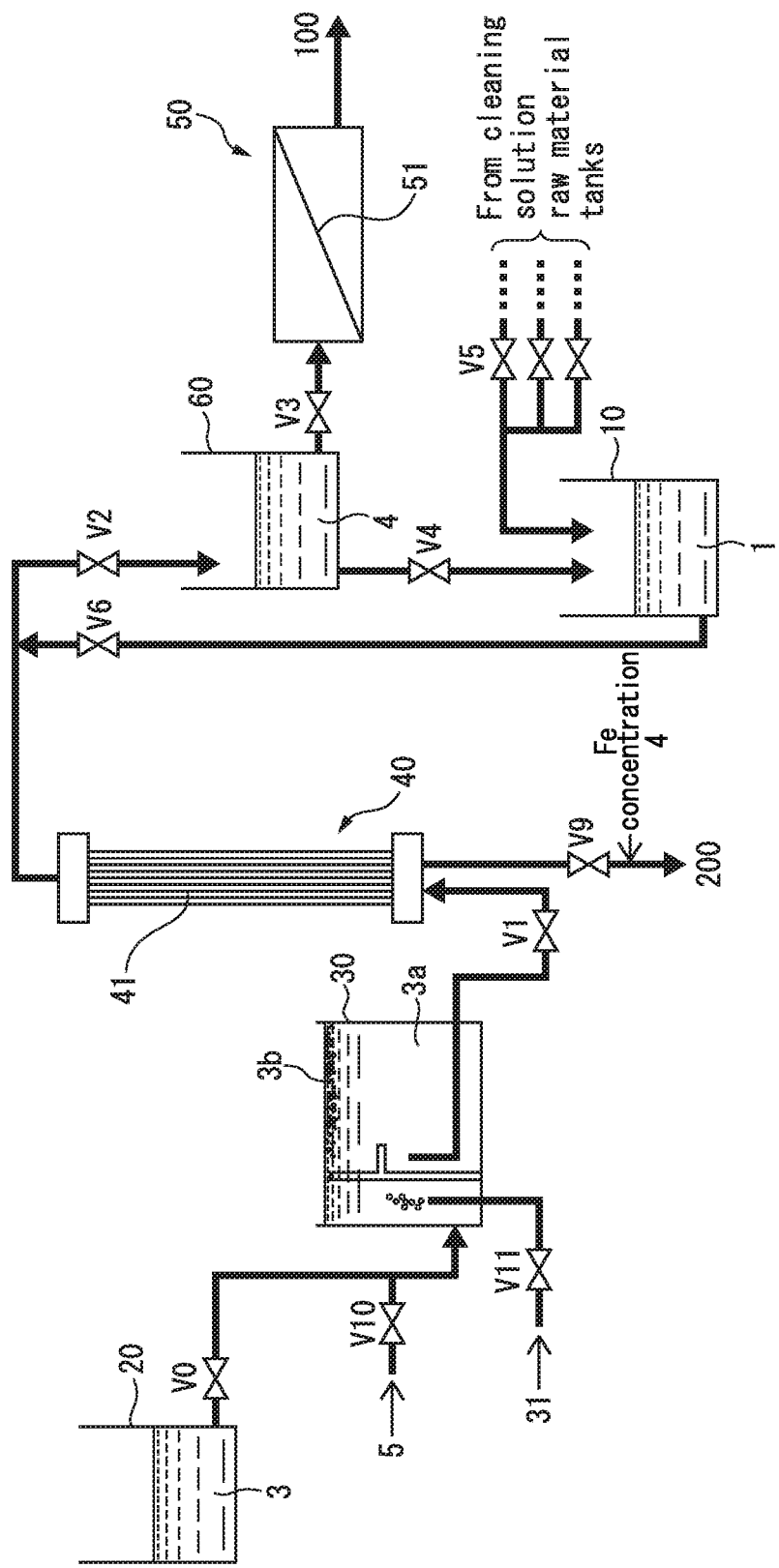
FIG. 6 is a schematic view showing yet another example of the seawater desalination method of the present invention.

FIGS. 2 and 3 as well as FIGS. 5 and 6 are schematic views showing examples of the seawater desalination method.

The seawater desalination method shown in FIG. 2 is an example in which the deposit removal step is performed by a circulation filtration cleaning method and/or a circulation surface cleaning method, and the seawater desalination method shown in FIG. 3 is an example in which the deposit removal step is performed by an immersion cleaning method.

The seawater desalination method shown in FIG. 2 has a structure in which a cleaning solution tank (10) has been attached to the seawater desalination process of FIG. 1, which comprises a seawater tank (20), a filtration unit (40), a seawater after first filtration step tank (60), and a reverse osmosis unit (50). Thus, the filtration unit (40) of FIG. 2 is identical to the filtration unit (40) of FIG. 1. Though the filtration unit (40) of FIG. 2 is an external pressure-type module comprising water flow holes in a potting part thereof, the present invention is not limited thereto.

Plumbing for connection with the cleaning solution tank (10) and valves for opening and closing the flow paths in the plumbing are also shown in FIG. 2. Pumps for feeding liquids, stirrers for stirring the liquids, compressors for pressurizing the liquids, etc., are not shown.

In the process of FIG. 2, by opening the seawater desalination valves (V1, V2, V3) and closing the other valves, flow paths from the seawater tank (20) to the filtration unit (40), from the filtration unit (40) to the seawater after first filtration step tank (60), and from the seawater after first filtration step tank (60) to the reverse osmosis unit (50) are opened, and the other flow paths are closed. As a result, seawater (3) stored in the seawater tank (20) flows to the filtration unit (40), is filtered by the microfiltration membrane or ultrafiltration membrane (41) in the filtration unit (40), flows to the reverse osmosis unit (50) via the seawater after first filtration step tank (60), and is subjected to reverse osmosis filtration by the reverse osmosis membrane (51) in the reverse osmosis unit (50) to produce freshwater (100).

If such a seawater desalination process is carried out continuously for a predetermined interval, deposits adhere to the filter used in the process, for example, the microfiltration membrane or the ultrafiltration membrane (41) in the filtration unit (40), whereby the transmembrane pressure increases, and the filtration flow rate is reduced.

When the transmembrane pressure reaches a predetermined value, the operation of the seawater desalination process is stopped, and the cleaning process for removing the deposits from the filter is carried out.

The cleaning process of the seawater desalination method of the present invention comprises:
a cleaning solution preparation step in which a cleaning solution is prepared, and
a deposit removal step in which deposits on the filter are removed by contacting the filter and the cleaning solution.

Prior to carrying out the cleaning process, the seawater desalination valves (V1, V2, V3) are closed, and the flow paths from the seawater tank (20) to the filtration unit (40), from the filtration unit (40) to the seawater after first filtration step tank (60), and from the seawater after first filtration step tank (60) to the reverse osmosis unit (50) are closed.

In the cleaning solution preparation step, the seawater after first filtration step supply valve (V4) and the chemical raw material supply valve (V5) are opened, the flow paths from the seawater after first filtration step tank (60) and a cleaning solution raw material tank (not illustrated) to the cleaning solution tank (10) are opened, and a suitable amount of chemical raw materials and seawater after first filtration step (4) flow into the cleaning solution tank (10), to prepare the cleaning solution (1). At this time, the iron compound concentration in the cleaning solution (1) can be confirmed by measuring the iron compound concentration in the cleaning solution (1) by sampling a part of the cleaning solution (1) from the iron compound concentration measurement position indicated as, for example, "Fe concentration 1" in FIG. 2.

After preparation of the cleaning solution has completed, the seawater after first filtration step supply valve (V4) and the chemical raw material supply valve (V5) are closed, and the flow paths opened for preparation is closed.

The cleaning solution preparation step may be carried out prior to carrying out the seawater desalination process, may be carried out concurrently with the operation of the seawater desalination process, or may be carried out after the seawater desalination process has been stopped.

In the deposit removal step, the cleaning solution supply valve (V6), and a cleaning solution return valve (V7 or V8 or both) are opened, to open the flow paths from the cleaning solution tank (10) to the filtration unit (40) and from the filtration unit (40) to the cleaning solution tank (10). As a result, the cleaning solution (1) in the cleaning solution tank (10) can be contacted with the microfiltration membrane or ultrafiltration membrane (41) in the filtration unit (40) by, for example, a circulation filtration cleaning or circulation surface cleaning method, or by performing circulation filtration cleaning and circulation surface cleaning simultaneously, whereby the deposits on the microfiltration membrane or ultrafiltration membrane (41) can be gradually cleaned and removed.

In the method of FIG. 2,
cleaning solution (1) is introduced into the filtration unit (40) from an inner pipe below the filtration unit (40), flows through, for example, the water flow holes in the potting part and along the outside of the hollow-fiber-type microfiltration membrane or ultrafiltration membrane (41), and thereafter passes through the microfiltration membrane or ultrafiltration membrane (41) into the hollow inner part of the membrane, whereby filtration cleaning is performed (in the case in which V7 is open and V8 is closed), cleaning solution (1) is introduced into the filtration unit (40) from an inner pipe below the filtration unit (40), flows through, for example, the water flow holes in the potting part and along the outside of the hollow-fiber-type microfiltration membrane or ultrafiltration membrane (41), and thereafter flows along the surface of the microfiltration membrane or ultrafiltration membrane (41), whereby surface cleaning is performed (in the case in which V7 is closed and V8 is open), or filtration cleaning and surface cleaning can be carried out simultaneously (in the case in which both V7 and V8 are open).

When the deposit removal step is carried out by an aspect of circulation cleaning, by sampling from the iron compound concentration measurement positions indicated as, for example, "Fe concentration 1" and "Fe concentration 2" in FIG. 2 during performance of the deposit removal step, the concentrations of the components of the cleaning solution (1) can be continuously or periodically monitored, and as necessary, the addition of cleaning solution raw materials or dilution of the cleaning solution (1) can be performed. In particular, when the measurement value of the iron compound concentration in the cleaning solution (1) is less than 1.50 mmol/L in terms of iron atoms, it is preferable that iron compound be added to the cleaning solution (1) to adjust the iron compound concentration in terms of iron atoms to 1.50 mmol/L or more. The addition of iron compound to the cleaning solution (1) may be carried out by a method in which iron compound is directly added to the cleaning solution tank (10), or may be carried out by a method in which iron compound is added to an arbitrary position in the plumbing from the cleaning solution tank (10) to the filtration unit (40).

After cleaning of the microfiltration membrane or ultrafiltration membrane (41) has completed, the cleaning solution (1) is removed from the filtration unit (40), and the microfiltration membrane or ultrafiltration membrane (41) is rinsed as necessary. Thereafter, the seawater desalination valves (V1, V2, V3) may be opened again and the other valves closed to continue the seawater desalination.

The cleaning effect may be confirmed after cleaning for a predetermined interval has completed by comparing with the initial value of the transmembrane pressure or by comparing with the initial value of the permeability performance.

The cleaning solution after being subjected to the deposit removal step may be discarded as, for example, cleaning drainage (200) by opening the cleaning drainage discharge valve (V9).

Though the seawater desalination method shown in FIG. 3 has a structure which is substantially identical to the seawater desalination method of FIG. 2 in terms of the provision of a seawater tank (20), a filtration unit (40), a seawater after first filtration step tank (60), a reverse osmosis unit (50), and a cleaning solution tank (10), the arrangement configuration of the plumbing and the valves is different.

In the method of FIG. 3, by opening the seawater desalination valves (V1, V2, V3) and closing the other valves, seawater desalination can be carried by an aspect which is identical to that of the method of FIG. 2, whereby freshwater (100) is obtained.

In the method of FIG. 3, the seawater desalination process is continuously operated for a certain period of time, and when the transmembrane pressure reaches a predetermined value, the seawater desalination process is stopped and the cleaning process for removing the deposits from the filter is carried out.

The cleaning solution preparation step of the seawater desalination method shown in FIG. 3 is performed by an aspect which is identical to that of the method shown in FIG. 2.

In the deposit removal step, the cleaning solution supply valve (V6) and the cleaning drainage discharge valve (V9) are opened to open the flow paths from the cleaning solution tank (10) to the filtration unit (40) and from the filtration unit (40) to the outside of the system, and after replacing the liquid in the filtration unit (40) with the cleaning solution (1), the cleaning drainage discharge valve (V9) is closed. As a result, the filtration unit (40) is filled with cleaning solution (1), and the cleaning solution (1) can contact the microfiltration membrane or ultrafiltration membrane (41). After replacement of the liquid in the filtration unit (40) with cleaning solution (1) has completed, the cleaning solution supply valve (V6) and the cleaning drainage discharge valve (V9) are closed, and immersion cleaning is carried out by sealing the filtration unit (40) and allowing it to stand for a predetermined interval. As a result, the deposits on the microfiltration membrane or ultrafiltration membrane (41) are gradually cleaned and removed.

In the method of FIG. 3, the cleaning solution (1) is introduced into the filtration unit (40) from an inner pipe above the filtration unit (40), flows into the space inside the hollow fibers of the microfiltration membrane or ultrafiltration membrane (41), passes through the outer wall of the membrane to the outer space, and fills the filtration unit (40).

After cleaning of the microfiltration membrane or ultrafiltration membrane (41) has completed, the cleaning drainage discharge valve (V9) is opened to discard the cleaning solution (1) in the filtration unit (40) as, for example, cleaning drainage (200), the microfiltration membrane or ultrafiltration membrane (41) is rinsed as necessary, and thereafter, the seawater desalination valves (V1, V2, V3) are opened, the other valves are closed, and seawater desalination may be continued.

The cleaning effect may be confirmed after cleaning for a predetermined interval has completed by comparing with the initial value of the transmembrane pressure or by comparing with the initial value of the permeability performance.

The concentration of the iron compound included in the cleaning solution after having been subjected to the deposit removal step can be confirmed by, for example, sampling and measuring from the iron compound concentration measurement position indicated as "Fe concentration 2" in FIG. 3 at the time of disposal of the cleaning drainage (200).

When the seawater desalination method of the present invention includes an aggregation step, the seawater desalination method of the present invention comprises:
a seawater desalination process, comprising:
an aggregation step in which a flocculant comprising an iron compound is added to the seawater, and suspended substances in the seawater are aggregated and removed,
a first filtration step in which the seawater after the aggregation step is micro-filtered or ultra-filtered, and
a second filtration step in which a reverse osmosis treatment is performed on the seawater after the first filtration step, and
a filter cleaning process in which the filter used in the seawater desalination process is cleaned, wherein
the filter is the microfiltration membrane or ultrafiltration membrane used in the first filtration step,
the flocculant used in the aggregation step comprises an iron compound, and
the cleaning process comprises:
a cleaning solution preparation step in which a cleaning solution is prepared, and
a deposit removal step in which deposits on the filter are removed by contacting the filter and the cleaning solution.

In the cleaning solution preparation step, the iron compound may be added to the seawater after the first filtration step along with hydrogen peroxide. However, in an aspect in which the aggregation step is further included prior to the first filtration step, in the aggregation step, the flocculant comprising an iron compound is added to the seawater, and thus, in the cleaning solution preparation step, it may not be necessary to add iron compound to the seawater after the first filtration step in some cases.

Regarding the steps constituting the seawater desalination process and filter cleaning process of the seawater desalination method of the present application in this case, refer to the explanations regarding the steps of the filter cleaning method of the present invention.

FIGS. 5 and 6 are schematic views showing examples of a seawater desalination method including an aggregation step.

The seawater desalination method shown in FIG. 5 is an example of the case in which the deposit removal step is performed by a circulation filtration cleaning method, and the seawater desalination method shown in FIG. 6 is an example of the case in which the deposit removal step is performed by an immersion cleaning method and/or circulation surface cleaning method.

The seawater desalination method shown in FIG. 5 has a configuration in which a cleaning solution tank (10) is attached to the seawater desalination process of FIG. 4, which is performed by a device comprising a seawater tank (20), a flotation tank (30), a filtration unit (40), a seawater after first filtration step tank (60), and a reverse osmosis unit (50). Thus, the filtration unit (40) of FIG. 5 is identical to the filtration unit (40) of FIG. 4. Though the filtration unit (40) of FIG. 5 is an external pressure-type module comprising water flow holes in a potting part thereof, the present invention is not limited thereto.

Plumbing for connection with the cleaning solution tank (10) and valves for opening and closing the flow paths in the plumbing are also shown in FIG. 5. Pumps for feeding liquids, stirrers for stirring the liquids, compressors for pressurizing the liquids, etc., are not shown.

In the process of FIG. 5, the seawater desalination valves (V0, V1, V2, V3), the flocculant supply valve (V10), and the pressurized water supply valve (V11) are opened and the other valves are closed, whereby the flow paths from the seawater tank (20), a flocculant tank (not illustrated), and a pressurized water tank (not illustrated) to the flotation tank (30), from the flotation tank (30) to the filtration unit (40), from the filtration unit (40) to the seawater after first filtration step tank (60), and from the seawater after first filtration step tank (60) to the reverse osmosis unit (50) and the other flow paths are closed. Though the seawater (3) from the seawater tank (20) and the flocculant (5) from the flocculant tank (not illustrated) flows to the flotation tank (30) by means of line contact, the present invention is not limited to this aspect.

In the process of FIG. 5, by line-contacting the seawater stored in the seawater tank (20) with the flocculant (5), the suspended substances are aggregated to generate aggregates of suspended substances. The aggregates of suspended substances contact the pressurized water (31) in the flotation tank (30) to become scum (3b), and are separated and removed from the seawater (3). Thus, the seawater (3) flows to the filtration unit (40) as seawater after suspended substance removal (3a) from which the suspended substances have been removed. Thereafter, the seawater after suspended substance removal (3a) is filtered by the microfiltration membrane or ultrafiltration membrane (41) in the filtration unit (40), flows to the reverse osmosis unit (50) via the seawater after first filtration step tank (60), and is subjected to reverse osmosis filtration by the reverse osmosis membrane (51) in the reverse osmosis unit (50) to obtain freshwater (100).

If such a seawater desalination process is carried out continuously for a predetermined interval, the filter used in the process, for example, deposits adhere to the microfiltration membrane or the ultrafiltration membrane (41) in the filtration unit (40), whereby the transmembrane pressure increases, and the filtration flow rate is reduced.

When the transmembrane pressure reaches a predetermined value, the operation of the seawater desalination process is stopped, and the cleaning process for removing the deposit from the filter is carried out.

A seawater desalination continuous operation interval (i.e., the interval from the start of operation of seawater desalination until the cleaning process is performed, or the interval from the end of the cleaning process until the next cleaning process) of 0.5 hours to 1,000 hours is suitable. When the continuous operation interval is less than 0.5 hours, the amount of iron compound accumulated in the filter is small, and the cleaning effect may be insufficient in some cases. Conversely, when the continuous operation interval exceeds 1,000 hours, the amount of iron compound accumulated in the filter is excessively large, which may cause clogging of the filter in some cases. The continuous operation interval is preferably 3 hours to 168 hours (7 days).

The cleaning process of the seawater desalination method of the present invention comprises:
 a cleaning solution preparation step in which a cleaning solution is prepared, and
  a deposit removal step in which deposits on the filter are removed by contacting the filter and the cleaning solution.

Prior to carrying out the cleaning process, the seawater desalination valves (V0, V1, V2, V3), the flocculant supply valve (V10), and the pressurized water supply valve (V11) are closed to close the flow paths from the seawater tank (20), the flocculant tank (not illustrated), and the pressurized water tank (not illustrated) to the flotation tank (30), from the flotation tank (30) to the filtration unit (40), from the filtration unit (40) to the seawater after first filtration step tank (60), and from the seawater after first filtration step tank (60) to the reverse osmosis unit (50).

In the cleaning solution preparation step, the seawater after first filtration step supply valve (V4) and the chemical raw material supply valve (V5) are opened to open the flow paths from the seawater after first filtration step tank (60) and cleaning solution raw material tank (not illustrated) to the cleaning solution tank (10), and appropriate amounts of chemical raw materials and seawater after first filtration step (4) flow into the cleaning solution tank (10) to prepare the cleaning solution (1).

After the cleaning solution has been prepared, the seawater after first filtration step supply valve (V4) and the chemical raw material supply valve (V5) are closed to close the flow paths which were opened for preparation.

The cleaning solution preparation step may be carried out prior to operation of the seawater desalination process, may be carried out concurrently with the operation of the seawater desalination process, or may be performed after the seawater desalination process has stopped.

In the deposit removal step, the cleaning solution supply valve (V6) and a cleaning solution return valve (V7 or V8 or both) are opened to open the circulation flow path from the cleaning solution tank (10) to the filtration unit (40) and from the filtration unit (40) to the cleaning solution tank (10). As a result, cleaning solution (1) in the cleaning solution tank (10) can contact the microfiltration membrane or ultrafiltration membrane (41) in the filtration unit (40) by, for example, a circulation filtration cleaning or circulation surface cleaning method, or by a method in which circulation filtration cleaning and circulation surface cleaning are carried out simultaneously, whereby deposits on the microfiltration membrane or ultrafiltration membrane (41) can be gradually cleaned and removed.

In the method of FIG. 5, cleaning solution (1) from the cleaning solution tank (10) is introduced into the filtration unit (40) from an inner pipe below the filtration unit (40), flows, for example, through the water flow holes of the potting part to the outside of the hollow-fiber microfiltration membrane or ultrafiltration membrane (41), thereafter passes through the microfiltration membrane or ultrafiltration membrane (41), reaches the space inside the membrane, and returns to cleaning solution tank (10), whereby circulation filtration cleaning is carried out (in the case in which V7 is open and V8 is closed), cleaning solution (1) from the cleaning solution tank (10) is introduced into the filtration unit (40) from an inner pipe below the filtration unit (40), flows, for example, through the water flow holes in the potting part to the outside of the hollow-fiber microfiltration membrane or ultrafiltration membrane (41), flows along the surface of the microfiltration membrane or ultrafiltration membrane (41) and returns to the cleaning solution tank (10), whereby circulation surface cleaning is carried out (in the case in which V7 is closed and V8 is open), or circulation filtration cleaning and circulation surface cleaning are performed simultaneously (in the case in which V7 and V8 are both open).

During cleaning, the concentration of iron compound in the cleaning solution may be monitored by, for example, sampling from the iron compound concentration measurement position indicated as "Fe concentration 3" in FIG. 5, and the addition of cleaning solution raw materials or the dilution of the cleaning solution (1) may be carried out as necessary. In particular, when the measurement value of the concentration of iron compound in the cleaning solution (1) is less than 1.50 mmol/L in terms of iron atoms, it is preferable that iron compound be added to the cleaning solution 1 to adjust the concentration of iron compound in terms of iron atoms to 1.50 mmol/L or more. The addition of iron compound to the cleaning solution (1) may be carried out by a method in which iron compound is directly added to the cleaning solution tank (10), or may be carried out by a method in which iron compound is added from an arbitrary position in the plumbing from the cleaning solution tank (10) to the filtration unit (40).

After cleaning of the microfiltration membrane or ultrafiltration membrane (41) has completed, the cleaning solution (1) is removed from the filtration unit (40), and the microfiltration membrane or ultrafiltration membrane (41) is rinsed as necessary. Thereafter, the seawater desalination valves (V0, V1, V2, V3), the flocculant supply valve (V10), and the pressurized water supply valve (V11) are opened again and the other valves closed, and seawater desalination may be continued.

The cleaning effect may be confirmed after cleaning for a predetermined interval has completed by comparing with the initial value of the transmembrane pressure or by comparing with the initial value of the permeability performance.

The cleaning solution after being subjected to the deposit removal step may be discarded as, for example, cleaning drainage (200) by opening the cleaning drainage discharge valve (V9).

Though the seawater desalination method shown in FIG. 6 has a configuration which is substantially identical to that of the seawater desalination method of FIG. 5 in terms of the provision of a seawater tank (20), a flotation tank (30), a filtration unit (40), a seawater after first filtration step tank (60), a reverse osmosis unit (50), and a cleaning solution tank (10), the arrangement configuration of the plumbing and the valves is different.

In the method of FIG. 6, by opening the seawater desalination valves (V0, V1, V2, V3), the flocculant supply valve (V10), and the pressurized water supply valve (V11) and closing the other valves, seawater desalination can be carried by an aspect which is identical to that of the method of FIG. 5, whereby freshwater (100) is obtained.

In the method of FIG. 6, the seawater desalination process is continuously operated for a certain period of time, and when the transmembrane pressure reaches a predetermined value, the seawater desalination process is stopped and the cleaning process for removing the deposits from the filter is carried out.

The time from the start of the seawater desalination operation to the time of that the cleaning process is carried out (the seawater desalination continuous operation interval) is the same as in the method of FIG. 5.

The cleaning solution preparation step of the seawater desalination method shown in FIG. 6 is performed by an aspect which is identical to that of the method shown in FIG. 5.

In the deposit removal step, the cleaning solution supply valve (V6) and the cleaning drain discharge valve (V9) are opened to open the flow paths from the cleaning solution tank (10) to the filtration unit (40) and from the filtration unit (40) to the outside of the system, and after replacing the liquid in the filtration unit (40) with the cleaning solution (1), the cleaning drainage discharge valve (V9) is closed. As a result, the filtration unit (40) is filled with cleaning solution (1), and the cleaning solution (1) can contact the microfiltration membrane or ultrafiltration membrane (41). After replacement of the liquid in the filtration unit (40) with cleaning solution (1) has completed, the cleaning solution supply valve (V6) and the cleaning drainage discharge valve (V9) are closed, and immersion cleaning is carried out by sealing the filtration unit (40) and allowing it to stand for a predetermined interval. As a result, the deposits on the microfiltration membrane or ultrafiltration membrane (41) are gradually cleaned and removed.

In the method of FIG. 6, the cleaning solution (1) is introduced into the filtration unit (40) from an inner pipe above the filtration unit (40), flows into the space inside the hollow fibers of the microfiltration membrane or ultrafiltration membrane (41), passes through the outer wall of the membrane to the outer space, and fills the filtration unit (40).

After cleaning of the microfiltration membrane or ultrafiltration membrane (41) has completed, the cleaning drainage discharge valve (V9) is opened to discard the cleaning solution (1) in the filtration unit (40) as, for example, cleaning drainage (200), the microfiltration membrane or ultrafiltration membrane (41) is rinsed as necessary, and thereafter, the seawater desalination valves (V0, V1, V2, V3), the flocculant supply valve (V10), and the pressurized water supply valve (V11) are opened, the other valves are closed, and seawater desalination may be continued.

The cleaning effect may be confirmed by comparing with the initial value of the transmembrane pressure or by comparing with the initial value of the permeability performance after cleaning for a predetermined interval has completed.

The cleaning solution after having been subjected to the deposit removal step can be discarded as, for example cleaning drainage (200) by opening the cleaning drainage discharge valve (V9). The concentration of the iron compound included in the cleaning solution after having been subjected to the deposit removal step can be confirmed by, for example, sampling and measuring from the iron compound concentration measurement position indicated as "Fe concentration 4" in FIG. 5 at the time of disposal of the cleaning drainage (200).

<<Seawater Desalination System>>

According to another aspect of the present invention, there is provided:
a seawater desalination system, comprising:
a seawater desalination means comprising:
a first filtration step in which seawater is micro-filtered or ultra-filtered, and
a second filtration step in which a reverse osmosis treatment is performed on seawater after the first filtration step, and
a filter cleaning means which cleans the filter used in the seawater desalination means, wherein
the filter is the microfiltration membrane or ultrafiltration membrane used in the first filtration step,
an iron compound is added to seawater in any stage of the seawater desalination system,
the cleaning means comprises:
a cleaning solution preparation step in which a cleaning solution is prepared, and
a deposit removal step in which deposits on the filter are removed by contacting the filter and the cleaning solution, and
in the cleaning solution preparation step, the cleaning solution is prepared by mixing at least hydrogen peroxide with the seawater after the first filtration step so that an iron compound concentration thereof is not less than 1.50 mmol/L in terms of iron atoms.

In the seawater desalination system of the present invention,
the cleaning solution preparation step, an iron compound may be added to the seawater after the first filtration step along with hydrogen peroxide.

The seawater desalination system of the present invention may further comprise, prior to the first filtration step,
an aggregation step in which a flocculant comprising an iron compound is added to the seawater, and suspended substances in the seawater are aggregated and removed.

Regarding the seawater desalination means and filter cleaning means constituting the seawater desalination system of the present invention, refer to the explanations regarding the seawater desalination process and filter cleaning process of the seawater desalination method of the present invention.

EXAMPLES

The present invention will be described in further detail below by means of the Examples and the Comparative Examples. However, the scope of the present invention is not limited thereby.

In Examples 1 to 8, Comparative Examples 1 to 5, and Reference Examples 1 to 3, a device comprising a filtration unit and a reverse osmosis unit was used, and after seawater desalination was performed for a predetermined interval, and the filtration unit having a reduced permeability was cleaned by a predetermined method, the degree of the recovery of the permeability was examined.

In the Examples, Comparative Examples, and Reference Examples, seawater desalination and filtration unit cleaning were carried out at ambient temperature (20 to 25° C.).

In the Examples, Comparative Examples, and Reference Examples, an external pressure-type membrane module produced by Asahi Kasei, Co., Ltd., comprising a laminate of a plurality of polyvinylidene fluoride hollow-fiber-type filtration membranes (microfiltration membrane) having an average pore size of 0.08 μm, the module having a length of 2 m and being housed in a six-inch diameter ABS casing was used as the filtration unit. The membrane surface area of the membrane module was 50 $m^2$.

Seawater having 2.0 mg/L to 5.0 mg/L of total organic carbons (TOC) as measured with a TOC meter produced by Analytik Jena AG, a turbidity of 1 to 10 NTU (Nephelometric Turbidity Units; relative value measured relative to a formazin standard solution), 150 mg/L to 450 mg/L of biopolymers, 5 to 600 mg/L of calcium, and 0.5 to 1,000 mg/L of magnesium was used as the raw water.

Desalination was performed on seawater as the raw water using a filtration unit (membrane module) and a reverse osmosis unit, and cleaning of the membrane module was performed when the permeability decreased to 28% (when the transmembrane pressure rose to 250 kPa) of the permeability when unused (initial value F0).

The degree of recovery of the permeability of the membrane module by the cleaning was evaluated from the permeability recovery rate determined by the following Formula (1) from the permeability when unused (F0) and the permeability after cleaning (F).

$$\text{Permeability recovery rate (\%)}=(F/F0)\times 100 \quad (1)$$

Example 1

In Example 1, seawater desalination and filtration unit circulation filtration cleaning were carried out using the basic device configuration shown in FIG. 2.

After seawater desalination was performed and the permeability of the membrane module decreased to 28% of the initial value, seawater desalination was topped, and cleaning of the membrane module was performed. Specifically, the following operations were performed.

After all of the valves were closed and seawater desalination was stopped, the chemical raw material supply valve (V5) and the seawater after first filtration step supply valve (V4) were opened, ferrous chloride (anhydrous salt), tartaric acid, and hydrogen peroxide, as cleaning solution raw materials, were mixed with seawater water after first filtration step (4) in the cleaning solution tank (10), and thereafter hydrochloric acid was additionally added to prepare a cleaning solution (1) having the following composition.

Ferrous chloride (value in terms of iron atoms): 1.68 mmol/L
Tartaric acid: 0.13 mmol/L
Hydrogen peroxide: 15 mmol/L
pH: 2.5

After preparation of the cleaning solution (1), the seawater after first filtration step supply valve (V4) and the chemical raw material supply valve (V5) were closed, the cleaning solution supply valve (V6) and the cleaning solution return valves (V7, V8) were opened, and cleaning was performed for 30 minutes at a cleaning solution (1) supply flow rate of 0.5 m³/hr by a method in which circulation filtration cleaning and circulation surface cleaning are performed simultaneously.

At this time, the cleaning solution (1) was supplied along the outside of the hollow-fiber membrane (41) of the membrane module (40), passed through the outer wall of the hollow-fiber membrane (41), and was discharged from the inside. Further, the iron compound concentration in the cleaning solution was continuously monitored by sampling from iron compound concentration measurement positions (Fe concentration 1, Fe concentration 2), and the iron compound concentration in the cleaning solution (1) was maintained at the initial value by adding ferrous chloride to the cleaning solution tank (10) as necessary.

After 30 minutes of cleaning had elapsed, the cleaning solution was discharged from the membrane module (40), and rinsing was performed by flowing 300 liters of tap water through the membrane module (40) over 30 minutes.

The permeability recovery rate was 51% as a result of cleaning by the above cleaning method. Furthermore, the iron compound concentration measured at the "Fe concentration 2" iron compound concentration measurement position was 7.20 mmol/L when cleaning ended (30 minutes after the start of cleaning).

Examples 2 to 7 and Comparative Examples 1 to 5

Seawater desalination and membrane module cleaning were performed in the same manner as Example 1 except that the concentrations of the components of the cleaning solutions (1) were as described in Table 1.

The results are shown in Table 1.

Reference Examples 1 to 3

Seawater desalination and membrane module cleaning were performed in the same manner as Example 1 except that the concentrations of the components of the cleaning solutions (1) were as described in Table 1, and further, freshwater (100) which was passed through the reverse osmosis unit (50) was used as the cleaning solution dilution solvent in place of the seawater after first filtration step (4).

The results are shown in Table 1.

Example 8

In Example 8, seawater desalination and filtration unit immersion cleaning were carried out using the basic device configuration shown in FIG. 3.

After seawater desalination was carried out and the permeability of the membrane module decreased to 28% of the initial value, seawater desalination was stopped, and cleaning of the membrane module was performed. Specifically, the following operations were performed.

After all of the valves were closed and seawater desalination was stopped, the seawater after first filtration step supply valve (V4) and the chemical raw material supply valve (V5) were opened to prepare a cleaning solution (1) having a composition which is identical to that of the cleaning solution of Example 5 in the cleaning solution tank (10).

After preparation of the cleaning solution (1), the seawater after first filtration step supply valve (V4) and the chemical raw material supply valve (V5) were closed, and the cleaning solution supply valve (V6) and the cleaning drainage discharge valve were opened to replace the cleaning solution (1) in the membrane module (40). Thereafter, the cleaning solution supply valve (V6) and the cleaning drainage discharge valve were closed, and immersion cleaning was carried out for one hour.

After one hour of cleaning had elapsed, the cleaning solution was discharged from the membrane module (40), and rinsing was performed by flowing 300 liters of tap water through the membrane module (40) over 30 minutes.

The permeability recovery rate was 55% as a result of cleaning by the above cleaning method. Furthermore, the iron compound concentration as measured at the "Fe concentration 2" iron compound concentration measurement position was 19.8 mmol/L when the cleaning solution was discharged after cleaning had ended.

TABLE 1

| | Cleaning Solution | | | | | | |
|---|---|---|---|---|---|---|---|
| | Initial Concentration of Components (mmol/L) | | | | Iron Atom | | |
| | Ferrous Chloride (Value in terms of Iron Particles) | Tartaric Acid | $H_2O_2$ | pH | Concentration at End of Cleaning (mmol/L) | Cleaning Method | Permeability Recovery Rate (%) |
| Ex. 1 | 1.68 | 0.13 | 15 | 2.5 | 7.20 | Circulation Filtration | 50 |
| Ex. 2 | 12.3 | 0.26 | 30 | 2.5 | 17.8 | Circulation Filtration | 51 |
| Ex. 3 | 35.9 | 0.26 | 30 | 2.5 | 41.4 | Circulation Filtration | 50 |
| Ex. 4 | 13.3 | 0.78 | 90 | 2.5 | 18.8 | Circulation Filtration | 49 |
| Ex. 5 | 36.9 | 0.78 | 90 | 2.5 | 42.4 | Circulation Filtration | 52 |
| Ex. 6 | 14.3 | 1.33 | 150 | 2.5 | 19.8 | Circulation Filtration | 55 |
| Ex. 7 | 37.9 | 1.33 | 150 | 2.5 | 43.4 | Circulation Filtration | 52 |
| Ex. 8 | 14.3 | 1.33 | 150 | 2.5 | 19.8 | Immersion | 55 |
| Comp. Ex. 1 | 0.05 | 0.26 | 30 | 2.5 | 5.57 | Circulation Filtration | 39 |
| Comp. Ex. 2 | 0.05 | 33.4 | 30 | 2.5 | 5.57 | Circulation Filtration | 35 |

TABLE 1-continued

| | Cleaning Solution | | | | | | |
|---|---|---|---|---|---|---|---|
| | Initial Concentration of Components (mmol/L) | | | | Iron Atom | | |
| | Ferrous Chloride (Value in terms of Iron Particles) | Tartaric Acid | $H_2O_2$ | pH | Concentration at End of Cleaning (mmol/L) | Cleaning Method | Permeability Recovery Rate (%) |
| Comp. Ex. 3 | 0.05 | 66.7 | 30 | 2.5 | 5.57 | Circulation Filtration | 35 |
| Comp. Ex. 4 | 0.05 | 0.26 | 90 | 2.5 | 5.57 | Circulation Filtration | 37 |
| Comp. Ex. 5 | 0.05 | 0.26 | 150 | 2.5 | 5.57 | Circulation Filtration | 36 |
| Ref. Ex. 1 | 0.05 | 0.26 | 30 | 2.5 | 5.57 | Circulation Filtration | 51 |
| Ref. Ex. 2 | 0.15 | 0.78 | 90 | 2.5 | 5.67 | Circulation Filtration | 60 |
| Ref. Ex. 3 | 0.25 | 1.33 | 150 | 2.5 | 5.77 | Circulation Filtration | 61 |

In Examples 9 and 10 as well as Comparative Examples 6 and 7, seawater desalination was carried out for a predetermined interval using a device comprising a flotation tank, a filtration unit, and a reverse osmosis unit, and the degree of recovery of permeability was examined after the filtration unit having a reduced permeability was cleaned by a predetermined method.

In these Examples and Comparative Examples, seawater desalination and filtration unit cleaning were performed at ambient temperature (20 to 25° C.).

In the Examples and the Comparative Examples, an external pressure-type membrane module produced by Asahi Kasei, Co., Ltd., comprising a laminate of a plurality of polyvinylidene fluoride hollow-fiber-type filtration membranes (microfiltration membrane) having an average pore size of 0.08 μm, the module having a length of 2 m and being housed in a six-inch diameter ABS casing was used as the filtration unit. The membrane surface area of the membrane module was 50 m².

Seawater which is identical to that of Example 1 was used as the raw water, and pressure surfacing and desalination were performed by the filtration unit (membrane module) and reverse osmosis unit, and cleaning of the membrane module was performed when the permeability decreased to 28% (when the transmembrane pressure increased to 250 kPa) of the permeability when unused (initial value F0). The degree of recovery of the permeability of the membrane module by the cleaning was evaluated from the permeability recovery rate determined by Formula (1) above.

Example 9

In Example 9, seawater desalination and filtration unit circulation filtration cleaning were performed using the basic device configuration shown in FIG. 5.

Seawater (3), which is the raw water, was stored in the seawater tank (20).

The seawater desalination valves (V0, V1, V2, V3), the flocculant supply valve (V10), and the pressurized water supply valve (V11) were opened to perform seawater desalination. At this time, a ferric chloride aqueous solution having a 32 wt % concentration was added as the flocculant (5) and mixed with the seawater from the seawater tank (20) by line contact, and the iron compound concentration in the seawater after mixing was adjusted to 0.002 mmol/L in terms of iron atoms.

As a result, the suspended substances in the seawater were aggregated to form aggregates, and the seawater containing the aggregates was flowed to the flotation tank (30).

In the flotation tank (30), microbubbles from the pressurized water (31) adhered to the aggregates in the seawater (3) to impart buoyancy thereto to produce scum (3b). Thus, the seawater (3) was separated into seawater after suspended substance removal (3a) and scum (3b). Seawater desalination was carried out for three hours by an aspect in which the seawater after suspended substance removal (3a) was supplied to the membrane module (40) and thereafter flowed to the reverse osmosis unit (50) via the seawater after first filtration step tank (60).

After seawater desalination was carried out and the permeability of the membrane module (40) decreased to 28% of the initial value, seawater desalination was stopped and cleaning of the membrane module was carried out. Specifically, the following operations were performed.

After all of the valves were closed and seawater desalination was stopped, the chemical raw material supply valve (V5) and the seawater after first filtration step supply valve (V4) were opened, a 32 wt % ferric chloride aqueous solution, tartaric acid, and hydrogen peroxide, as cleaning solution raw materials, were mixed with seawater after first filtration step (40) in the cleaning solution tank (10), and thereafter hydrochloric acid was added to prepare a cleaning solution (1) having the following composition.

Ferric chloride (value in terms of iron atoms): 1.70 mmol/L
Tartaric acid: 0.13 mmol/L
Hydrogen peroxide: 15 mmol/L
pH: 2.5

After preparation of the cleaning solution (1), the seawater after first filtration step supply valve (V4) and the chemical raw material supply valve (V5) were closed, the cleaning solution supply valve (V6) and the cleaning solution return valves (V7, V8) were opened, and cleaning was carried out for 60 minutes at a cleaning solution (1) supply flow rate of 0.5 m³/hr. In the cleaning, circulation filtration cleaning and circulation surface cleaning were carried out simultaneously.

At this time, the cleaning solution (1) from the cleaning solution tank (10) was supplied to the outside of the hollow-fiber membrane (41) of the membrane module (40), flowed through the outer wall of the hollow-fiber membrane (41), and returned to the cleaning solution tank (10) after reaching the inside.

Further, the iron compound concentration was continuously monitored by sampling from an iron compound concentration measurement position (Fe concentration). As a result, the iron concentration gradually increased from the initial value of 1.70 mmol/L as the cleaning time progressed, reached 6.00 mmol/L after about 5 minutes of cleaning time, and stabilized at this concentration.

After 60 minutes of cleaning had elapsed, the cleaning drainage discharge valve (V9) was opened to discharge the cleaning solution from the membrane module (40), and rinsing was carried out by flowing 300 liters of tap water through the membrane module (40) over 30 minutes.

The permeability recovery rate was 52% as a result of cleaning by the above cleaning method.

Comparative Example 6

Seawater desalination and membrane module cleaning were performed in the same manner as Example 9 except that an aluminum sulfate aqueous solution was used as the flocculant 5 and the aluminum sulfate concentration in the seawater after mixing the flocculant was 0.003 mmol/L in terms of aluminum atoms.

The iron concentration in the cleaning solution after cleaning had ended had not changed substantially from the initial value of 1.70 mmol/L.

The permeability recovery rate was 32% as a result of cleaning by the cleaning method of Comparative Example 6.

Example 10

In Example 10, seawater desalination and filtration unit immersion cleaning were carried out using the basic device configuration shown in FIG. 6.

After seawater desalination was carried out and the permeability of the membrane module decreased to 28% of the initial value, seawater desalination was stopped and cleaning of the membrane module was carried out. Specifically, the following operations were performed.

After all of the valves were closed and seawater desalination was stopped, the seawater after first filtration step supply valve (V4) and the chemical raw material supply valve (V5) were opened, and a cleaning solution (1) having the same composition as the cleaning solution of Example 1 was prepared in the cleaning solution tank (10).

After preparation of the cleaning solution (1), the seawater after first filtration step supply valve (V4) and the chemical raw material supply valve (V5) were closed, and the cleaning solution supply valve (V6) and the cleaning drainage discharge valve were opened to replace the cleaning solution (1) in the membrane module (40). Thereafter, the cleaning solution supply valve (V6) and the cleaning drainage discharge valve (V9) were closed and immersion cleaning was carried out for 60 minutes.

After 60 minutes of cleaning had elapsed, the cleaning drainage discharge valve (V9) was opened to discharge the cleaning solution from the membrane module (40), and rinsing was carried out by flowing 300 liters of tap water through the membrane module (40) over 30 minutes.

The iron concentration of the cleaning solution measured by sampling from an iron compound concentration measurement position (Fe concentration) was about 6.00 mmol/L at the time of discharge of the cleaning solution.

The permeability recovery rate was 53% as a result of cleaning by the above cleaning method.

Comparative Example 7

Seawater desalination and membrane module cleaning were carried out in the same manner as Example 10 except that an aluminum sulfate aqueous solution was used as the flocculant 5, and the aluminum sulfate concentration in the seawater after mixing of the flocculant was 0.003 mmol/L in terms of aluminum atoms.

The iron concentration in the cleaning solution after cleaning had ended did not substantially change from the initial value of 1.70 mmol/L.

The permeability recovery rate was 31% as a result of cleaning by the method of Comparative Example 7.

REFERENCE SIGNS LIST 1 cleaning solution
3 seawater
3a seawater after suspended substance removal
3b scum
4 seawater after first filtration step
5 flocculant
10 cleaning solution tank
20 seawater tank
30 flotation tank
31 pressurized water
40 filtration unit (membrane module)
41 microfiltration membrane or ultrafiltration membrane
50 reverse osmosis unit
51 reverse osmosis membrane
60 seawater after first filtration step tank
100 freshwater
200 cleaning drainage
V0, V1, V2, V3 seawater desalination valve
V4 seawater after first filtration step supply valve
V5 chemical raw material supply valve
V6 cleaning solution supply valve
V7, V8 cleaning solution return valve
V9 cleaning drainage discharge valve
V10 flocculant supply valve
V11 pressurized water supply valve
Fe concentration 1, 2, 3, 4 iron compound concentration measurement position

The invention claimed is:

1. A seawater desalination method, comprising:
a seawater desalination process, comprising:
    a first filtration in which seawater is micro-filtered or ultra-filtered, and
    a second filtration in which a reverse osmosis treatment is performed on seawater after the first filtration; and
a filter cleaning process in which a filter used in the seawater desalination process is cleaned, wherein
the seawater contains an inorganic compound comprising alkali metal or alkali earth metal,
the filter is a microfiltration membrane or ultrafiltration membrane used in the first filtration,
an iron compound is added to seawater during any stage of the desalination method,
the cleaning process comprises:
    a cleaning solution preparation in which a cleaning solution is prepared, and
    a deposit removal in which deposits on the filter are removed by contacting the filter and the cleaning solution, and in the cleaning solution preparation, the cleaning solution is prepared by mixing a hydroxy dicarboxylic acid with the seawater after the first filtration and by mixing at least hydrogen peroxide with the seawater after the first filtration so that an initial iron compound concentration of the cleaning solution is within an initial range of 14.3 mmol/L to 37.9 mmol/L in terms of iron atoms, and adding additional iron compound such that a final iron compound concentration at the end of cleaning is within a final range of 19.8 mmol/L to 43.4 mmol/L; and performing the deposit removal via a circulation cleaning method, in the deposit removal, continuously or periodically carrying out measurement of the concentration of iron compound in the cleaning solution, and obtaining a measurement value of the iron compound concentration and adding the additional iron compound to the cleaning solution such that the iron compound concentration increases from the initial range.

2. The seawater desalination method according to claim 1, wherein in the cleaning solution preparation, the additional iron compound is added to the seawater after the first filtration along with hydrogen peroxide.

3. The seawater desalination method according to claim 1, further comprising, prior to the first filtration:
an aggregation in which a flocculant comprising an iron compound is added to the seawater, and suspended substances in the seawater are aggregated and removed.

4. The seawater desalination method according to claim 1, wherein the hydroxy dicarboxylic acid is one or more selected from the group consisting of malic acid, tartaric acid, tartronic acid, citramaric acid, dioxymaleic acid, and dioxymalonic acid.

5. A seawater desalination method, comprising:
a seawater desalination process, comprising:
a first filtration in which seawater is micro-filtered or ultra-filtered, and
a second filtration in which a reverse osmosis treatment is performed on seawater after the first filtration; and
a filter cleaning process in which a filter used in the seawater desalination process is cleaned, wherein
the seawater contains an inorganic compound comprising alkali metal or alkali earth metal,
the filter is a microfiltration membrane or ultrafiltration membrane used in the first filtration,
an iron compound is added to seawater during any stage of the desalination method,
the cleaning process comprises:
a cleaning solution preparation in which a cleaning solution is prepared, and
a deposit removal in which deposits on the filter are removed by contacting the filter and the cleaning solution, and
in the cleaning solution preparation, the cleaning solution is prepared by mixing a hydroxy dicarboxylic acid with the seawater after the first filtration and by mixing at least hydrogen peroxide with the seawater after the first filtration so that an initial iron compound concentration of the cleaning solution is within an initial range of 14.3 mmol/L to 37.9 mmol/L in terms of iron atoms, and adding additional iron compound such that a final iron compound concentration at the end of cleaning is within a final range of 19.8 mmol/L to 43.4 mmol/L; and performing the deposit removal via a filtration cleaning method, in the deposit removal, continuously or periodically carrying out measurement of the concentration of iron compound in the cleaning solution, and obtaining a measurement value of the iron compound concentration and adding the additional iron compound to the cleaning solution such that the iron compound concentration increases from the initial range.

6. A seawater desalination method, comprising:
a seawater desalination process, comprising:
a first filtration in which seawater is micro-filtered or ultra-filtered, and
a second filtration in which a reverse osmosis treatment is performed on seawater after the first filtration; and
a filter cleaning process in which a filter used in the seawater desalination process is cleaned, wherein
the seawater contains an inorganic compound comprising alkali metal or alkali earth metal,
the filter is a microfiltration membrane or ultrafiltration membrane used in the first filtration,
an iron compound is added to seawater during any stage of the desalination method,
the cleaning process comprises:
a cleaning solution preparation in which a cleaning solution is prepared, and
a deposit removal in which deposits on the filter are removed by contacting the filter and the cleaning solution, and
in the cleaning solution preparation, the cleaning solution is prepared by mixing a hydroxy dicarboxylic acid with the seawater after the first filtration and by mixing at least hydrogen peroxide with the seawater after the first filtration so that an initial iron compound concentration of the cleaning solution is within an initial range of 14.3 mmol/L to 37.9 mmol/L in terms of iron atoms, and adding additional iron compound such that a final iron compound concentration at the end of cleaning is within a final range of 19.8 mmol/L to 43.4 mmol/L; and performing the deposit removal via an immersion cleaning method, in the deposit removal, continuously or periodically carrying out measurement of the concentration of iron compound in the cleaning solution, and obtaining a measurement value of the iron compound concentration and adding the additional iron compound to the cleaning solution such that the iron compound concentration increases from the initial range.

* * * * *